US012636643B2

(12) United States Patent
Mukai et al.

(10) Patent No.: US 12,636,643 B2
(45) Date of Patent: May 26, 2026

(54) WATER SOFTENER

(71) Applicant: Panasonic Intellectual Property Management Co., Ltd., Osaka (JP)

(72) Inventors: Juri Mukai, Tokyo (JP); Yui Matsumoto, Aichi (JP); Hiroki Ishikawa, Aichi (JP); Yoshihiro Tsuji, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 800 days.

(21) Appl. No.: 17/628,431

(22) PCT Filed: Jul. 31, 2020

(86) PCT No.: PCT/JP2020/029428
§ 371 (c)(1),
(2) Date: Jan. 19, 2022

(87) PCT Pub. No.: WO2021/024938
PCT Pub. Date: Feb. 11, 2021

(65) Prior Publication Data
US 2022/0274100 A1 Sep. 1, 2022

(30) Foreign Application Priority Data

Aug. 2, 2019 (JP) ................................. 2019-142642
Sep. 26, 2019 (JP) ................................. 2019-174884
(Continued)

(51) Int. Cl.
*C02F 1/42* (2023.01)
*B01J 49/53* (2017.01)
(Continued)

(52) U.S. Cl.
CPC ............... *B01J 49/53* (2017.01); *B01J 49/57* (2017.01); *B01J 49/85* (2017.01); *C02F 1/42* (2013.01); *C02F 1/461* (2013.01)

(58) Field of Classification Search
CPC ... B01J 49/30; B01J 47/08; B01J 49/06; B01J 49/53; B01J 49/57; B01J 49/85;
(Continued)

(56) References Cited

U.S. PATENT DOCUMENTS 3,715,287 A * 2/1973 Johnson ................... B01J 47/04
210/264
6,136,907 A * 10/2000 Sunamori ................ C08K 9/04
524/430
(Continued)

FOREIGN PATENT DOCUMENTS

JP        2-169090 A      6/1990
JP    2000-140840 A      5/2000
(Continued)

OTHER PUBLICATIONS

McRae, W.A. (2000). Electroseparations, Electrodialysis. In Kirk-Othmer Encyclopedia of Chemical Technology, (Ed.). https://doi.org/10.1002/0471238961.0512050313031801.a01 (Year: 2000).*
(Continued)

*Primary Examiner* — Joseph W Drodge
(74) *Attorney, Agent, or Firm* — Rimon P.C.

(57) ABSTRACT

Water softening system includes water softening tank, neutralization tank, electrolysis tank, and treatment tank. Water softening tank softens raw water containing a hardness component with weakly acidic cation exchange resin. Neutralization tank neutralizes a pH of soft water that has flowed through water softening tank with weakly basic anion exchange resin. Electrolysis tank generates acidic electrolyzed water for regenerating weakly acidic cation exchange
(Continued)

106 resin of water softening tank and alkaline electrolyzed water for regenerating weakly basic anion exchange resin of neutralization tank. Treatment tank mixes the acidic electrolyzed water that has flowed through water softening tank and the alkaline electrolyzed water that has flowed through neutralization tank, and supplies the mixture of the acidic electrolyzed water and the alkaline electrolyzed water to electrolysis tank.

4 Claims, 17 Drawing Sheets

(30) Foreign Application Priority Data

| | | |
|---|---|---|
| Sep. 27, 2019 | (JP) ................................ | 2019-176623 |
| Sep. 30, 2019 | (JP) ................................ | 2019-178416 |
| Feb. 25, 2020 | (JP) ................................ | 2020-028962 |
| Feb. 25, 2020 | (JP) ................................ | 2020-028963 |
| Mar. 16, 2020 | (JP) ................................ | 2020-044869 |

(51) Int. Cl.

| | |
|---|---|
| *B01J 49/57* | (2017.01) |
| *B01J 49/85* | (2017.01) |
| *C02F 1/461* | (2023.01) |

(58) Field of Classification Search

CPC .. B01J 39/07; B01J 49/75; B01J 41/07; C02F 1/42; C02F 1/46; C02F 2201/46115; C02F 1/4695; C02F 1/4604; C02F 1/469; C02F 1/46104; C02F 2201/4613; C02F 1/461; C02F 1/66; C02F 5/00; C02F 2001/425; B01D 61/48

See application file for complete search history.

(56) References Cited

U.S. PATENT DOCUMENTS

| | | | | |
|---|---|---|---|---|
| 6,187,162 B1 * | 2/2001 | Mir | .......................... | B01J 47/08 |
| | | | | 204/632 |
| 6,296,751 B1 * | 10/2001 | Mir | ........................ | B01D 61/48 |
| | | | | 204/632 |
| 2006/0169641 A1 * | 8/2006 | Duke | ....................... | B01J 49/75 |
| | | | | 210/670 |
| 2010/0213066 A1 * | 8/2010 | Gifford | ................. | C02F 1/4695 |
| | | | | 204/632 |
| 2012/0103025 A1 * | 5/2012 | Nambu | ..................... | C02F 1/42 |
| | | | | 68/12.23 |
| 2013/0153507 A1 * | 6/2013 | Yamaoka | .................. | C02F 1/42 |
| | | | | 210/678 |
| 2013/0306565 A1 * | 11/2013 | Davis | ........................ | C02F 1/42 |
| | | | | 210/675 |

FOREIGN PATENT DOCUMENTS

| | | | | | |
|---|---|---|---|---|---|
| JP | 2001-170628 A | 6/2001 | | | |
| JP | 2001-276631 A | 10/2001 | | | |
| JP | 2009-165954 A | 7/2009 | | | |
| JP | 2011-030973 A | 2/2011 | | | |
| JP | 2014-100633 A | 6/2014 | | | |
| JP | 2014-210232 A | 11/2014 | | | |
| WO | WO-2012157236 A1 * | 11/2012 | ............. | B01J 47/04 | |

OTHER PUBLICATIONS

W. H. Holl, "PIII /Water Treatment/ Anion Exchangers: Ion Exchange", Karlsruhe Nuclear Research Center, Karlsruhe, Germany, AP, 2000 (Year: 2000).*

Tiger, H.L. and Sussman, S. "Demineralizing Solutions by a Two-Step Ion Exchange Process", Industrial and Engineering Chemistry, Feb. 1943, vol. 35 No. 2, 186-192 (Year: 1943).*

"Raw Water Preparation" Public Works; East Stroudsburg vol. 129, Iss. 5, (Apr. 1998): C8. (Year: 1998).*

Von Bargen, Matthew R. State University of New York College of Environmental Science and Forestry, ProQuest Dissertations & Theses, 2016, 10242558. (Year: 2016).*

WO2012157236A1_Description (Year: 2012).*

English Translation of Chinese Office Action dated Feb. 18, 2023 for the related Chinese Patent Application No. 202080052610.X.

"Industrial Chemistry", Edited by Shanghai Chemical Industry School, Chemical Industry Press, Dec. 1965 edition No. 1, p. 11.

English Translation of Chinese Office Action dated Aug. 25, 2023 for the related Chinese Patent Application No. 202080052610.X.

International Search Report and Written Opinion issued in International Patent Application No. PCT/JP2020/029428, dated Sep. 15, 2020; with partial English translation.

\* cited by examiner

FIG. 3

(VALVE INDICATES ON-OFF VALVE IN THE SPECIFICATION. PUMP INDICATES WATER PUMP.)

| | VALVE 124 | VALVE 125 | VALVE 126 | VALVE 120 | VALVE 121 | VALVE 122 | VALVE 123 | VALVE 130 | VALVE 131 | ELECTRODE | PUMP |
|---|---|---|---|---|---|---|---|---|---|---|---|
| IN WATER SOFTENING | ON | ON | ON | | | | | | | | |
| IN WATER INJECTION | ON | | | | ON | | | | | | |
| IN REGENERATION | | | | ON | ON | ON | ON | ON | | ON | ON |
| IN DRAINING | | | | ON | ON | ON | ON | ON | ON | | |

CIRCULATION CHANNEL 215

FIG. 7

(VALVE INDICATES ON-OFF VALVE IN THE SPECIFICATION. PUMP INDICATES WATER PUMP.)

| | VALVE 221 | VALVE 222 | VALVE 223 | VALVE 224 | VALVE 225 | VALVE 226 | ELECTRODE | PUMP |
|---|---|---|---|---|---|---|---|---|
| IN WATER SOFTENING | OFF | OFF | OFF | OFF | ON | ON | OFF | OFF |
| IN WATER INJECTION | OFF | OFF | ON | OFF | ON | OFF | OFF | OFF |
| IN REGENERATION | OFF | ON | ON | ON | OFF | OFF | ON | ON |
| IN DRAINING | ON | ON | ON | ON | OFF | OFF | OFF | ON |

301   309   306   305   311   307          308      304

303   310                    302

401

402   404   405   406

RAW WATER → ... → TREATED WATER 403   409        410   408   411   407

(a)

HARDNESS
(Ca2+)
/mg/L

250

200

150

100

60

50

18

0

75%

0 1          10     15     20          30

TIME/min (b)

pH

11

10.5

10

9.7

9

8.5

8

7

0 1   5   10     15     20          30

TIME/min

412

413

414

613

614

615

WATER SOFTENER

CROSS-REFERENCE OF RELATED APPLICATIONS

This application is the U.S. National Phase under 35 U.S.C. § 371 of International Patent Application No. PCT/JP2020/029428, filed on Jul. 31, 2020, which in turn claims the benefit of Japanese Application No. 2019-142642, filed on Aug. 2, 2019, Japanese Application No. 2019-174884, filed on Sep. 26, 2019, Japanese Application No. 2019-176623, filed on Sep. 27, 2019, Japanese Application No. 2019-178416, filed on Sep. 30, 2019, Japanese Application No. 2020-028962, filed on Feb. 25, 2020, Japanese Application No. 2020-028963, filed on Feb. 25, 2020, and Japanese Application No. 2020-044869, filed on Mar. 16, 2020, the entire disclosures of which Applications are incorporated by reference herein.

TECHNICAL FIELD

The present disclosure relates to a water softening system for obtaining domestic water.

BACKGROUND ART

Conventionally, as this kind of water softening system, many systems using a cation exchange resin have been proposed. For example, a water softening system is known in which a cation exchange resin (strongly acidic cation exchange resin) having a sodium ion as a functional group is used, and calcium ions or magnesium ions, which are hardness components contained in raw water, are ion-exchanged with sodium ions to obtain soft water.

Continuous use of the cation exchange resin reduces or eliminates the ion exchange capacity. That is, ion exchange cannot be performed after all the sodium ions, which are functional groups of the cation exchange resin, are exchanged for calcium ions or magnesium ions, which are hardness components. Therefore, it is necessary to regenerate the cation exchange resin in order to enable ion exchange again. As the regeneration treatment, a treatment of causing regenerating water such as saturated saline water to pass through the cation exchange resin is performed. In such a regeneration treatment, it is necessary to replenish salt periodically according to the amount of soft water used, and thus there is a problem that it takes time and effort to replenish salt. In addition, such a regeneration treatment causes an environmental problem because a large amount of salt is used.

Therefore, in a water softening system using a weakly acidic cation exchange resin, a method for regenerating a cation exchange resin with acidic electrolyzed water generated by electrolysis has been proposed (see, for example PTLs 1, 2) as a method for regenerating a cation exchange resin without using salt. The weakly acidic cation exchange resin has a proton at the terminal of the functional group, and softens raw water by exchanging calcium ions or magnesium ions contained in the raw water with hydrogen ions. Therefore, acidic electrolyzed water can regenerate the weakly acidic cation exchange resin.

CITATION LIST

Patent Literature

PTL 1: Unexamined Japanese Patent Publication No. 2011-30973

PTL 2: Unexamined Japanese Patent Publication No. 2009-165954

PTL 3: Unexamined Japanese Patent Publication No. 2014-100633

PTL 4: Unexamined Japanese Patent Publication No. 2014-210232

PTL 5: Unexamined Japanese Patent Publication No. 2000-140840

SUMMARY OF THE INVENTION

However, soft water treated with the weakly acidic cation exchange resin contains a large amount of exchanged hydrogen ions, and therefore the hydrogen ion index (pH) of the treated soft water decreases, and there is a problem that the soft water is not suitable for domestic water.

An object of the present disclosure is to provide a water softening system using a weakly acidic cation exchange resin, which can generate soft water that can be used as domestic water and can maintain its performance for a relatively long period of time by a regeneration treatment.

A water softening system according to the present disclosure includes: a water softening tank for softening raw water containing a hardness component with a weakly acidic cation exchange resin; a neutralization tank for neutralizing a pH of soft water that has flowed through the water softening tank with a weakly basic anion exchange resin; an electrolysis tank for generating acidic electrolyzed water for regenerating the weakly acidic cation exchange resin of the water softening tank and alkaline electrolyzed water for regenerating the weakly basic anion exchange resin of the neutralization tank; and a treatment tank for mixing the acidic electrolyzed water that has flowed through the water softening tank and the alkaline electrolyzed water that has flowed through the neutralization tank and suppling the mixture of the acidic electrolyzed water and the alkaline electrolyzed water to the electrolysis tank.

According to the water softening system of the present disclosure, in the water softening system using the weakly acidic cation exchange resin, soft water that can be used as domestic water can be generated, and the performance can be maintained for a relatively long period of time by the regeneration treatment.

BRIEF DESCRIPTION OF DRAWINGS

FIG. 3 is a diagram showing a state of the water softening system in operation.

FIG. 7 is a diagram showing an operation pattern of the water softening system.

DESCRIPTION OF EMBODIMENTS

Figure 1:
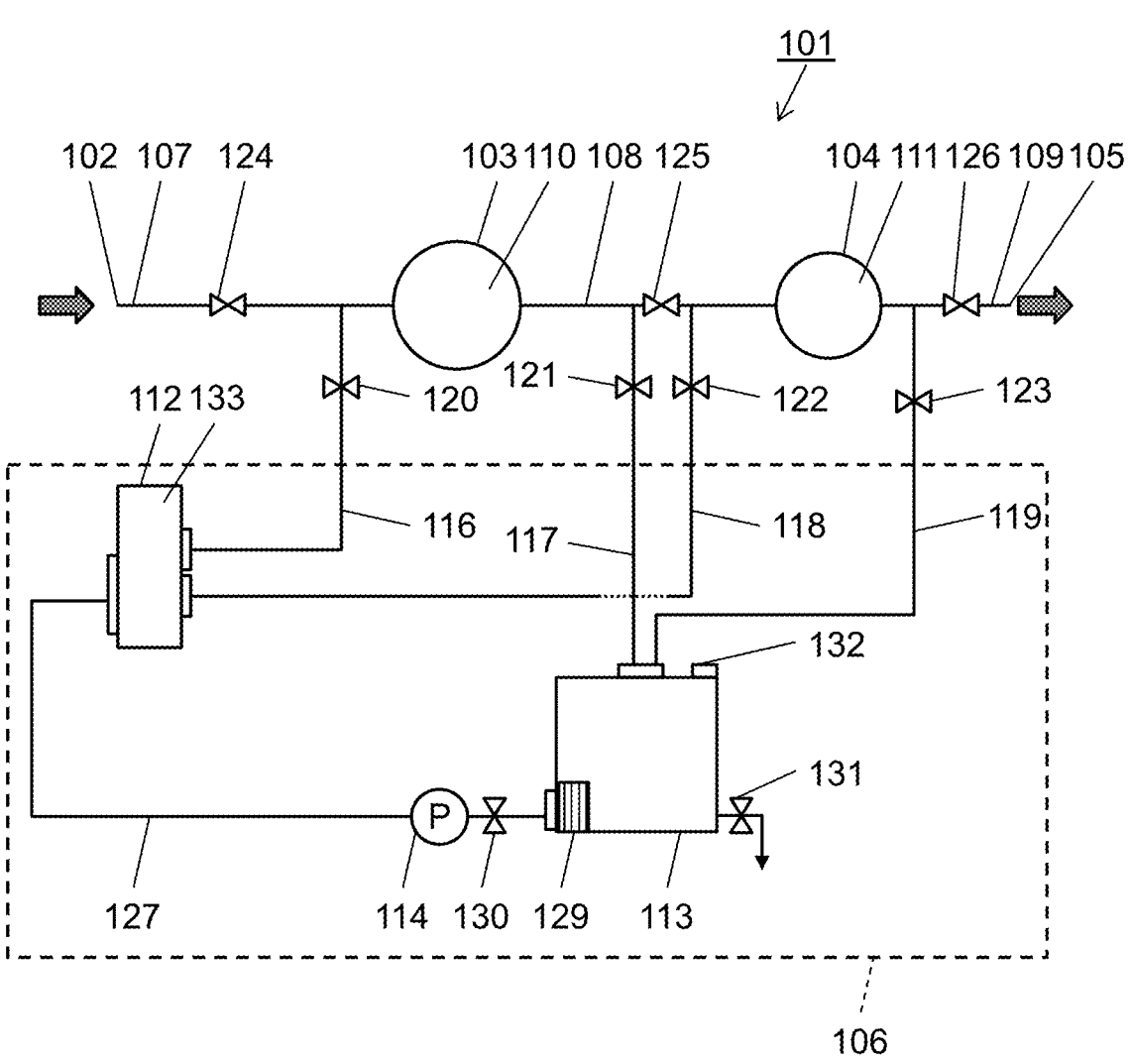
FIG. 1 is a conceptual diagram showing a configuration of a water softening system according to a first exemplary embodiment of the present disclosure.

A water softening system according to the present disclosure includes: a water softening tank for softening raw water containing a hardness component with a weakly acidic cation exchange resin; a neutralization tank for neutralizing a pH of soft water with a weakly basic anion exchange resin, the soft water having flowed through the water softening tank; an electrolysis tank for generating acidic electrolyzed water and alkaline electrolyzed water, the acidic electrolyzed water being to be used for regenerating the weakly acidic cation exchange resin of the water softening tank, the alkaline electrolyzed water being to be used for regenerating the weakly basic anion exchange resin of the neutralization tank; and a treatment tank for mixing the acidic electrolyzed water that has flowed through the water softening tank and the alkaline electrolyzed water that has flowed through the neutralization tank to generate a mixture, and suppling the mixture to the electrolysis tank.

Such a configuration allows the water softening system according to the present disclosure to generate soft water from raw water containing a hardness component with the water softening tank and the neutralization tank, the soft water that can be used as domestic water, and the raw water being supplied from the outside. On the other hand, the water softening system according to the present disclosure can regenerate the weakly acidic cation exchange resin of the water softening tank and the weakly basic anion exchange resin of the neutralization tank, respectively with the electrolysis tank and the treatment tank. Therefore, the system can keep the water softening performance for a relatively long period of time. That is, in the water softening system using the weakly acidic cation exchange resin, soft water that can be used as domestic water can be generated, and the performance can be maintained for a relatively long period of time by the regeneration treatment.

The water softening system according to the present disclosure further includes: a first supply channel capable of drawing the acidic electrolyzed water from the electrolysis tank and delivering the acidic electrolyzed water to an upstream side of the water softening tank; a second supply channel capable of drawing the alkaline electrolyzed water from the electrolysis tank and delivering the alkaline electrolyzed water to an upstream side of the neutralization tank; a first recovery channel that allows an upstream side of the treatment tank to be connected to a downstream side of the water softening tank; and a second recovery channel that allows the upstream side of the treatment tank to be connected to a downstream side of the neutralization tank. In a water softening treatment, by switching of on-off valves, the water softening system according to the present disclosure causes the raw water supplied from an outside to flow through the water softening tank and the neutralization tank in this order and discharges the raw water, and in a regeneration treatment, by switching of the on-off valves, the water softening system supplies water in the treatment tank from the electrolysis tank to the water softening tank through the first supply channel, recovers water that has flowed through the water softening tank into the treatment tank through the first recovery channel, supplies water in the treatment tank from the electrolysis tank to the neutralization tank through the second supply channel, and recovers water that has flowed through the neutralization tank into the treatment tank through the second recovery channel.

This allows the water softening system according to the present disclosure to easily switch between the water softening treatment and the regeneration treatment and execute the water softening treatment and the regenerating treatment.

Further, in the water softening system according to the present disclosure, the treatment tank generates a reaction product by a reaction between the acidic electrolyzed water that has flowed through the water softening tank and the alkaline electrolyzed water that has flowed through the neutralization tank, and a separation tank for separating the reaction product contained in water that has flowed through the treatment tank is provided between the treatment tank and the electrolysis tank.

This allows the water softening system according to the present disclosure to reliably separate the reaction product from the water supplied from the treatment tank to the electrolysis tank in the regeneration treatment. Therefore, the hardness component contained in the water supplied from the treatment tank to the electrolysis tank decreases as compared with the case where raw water containing a hardness component is supplied from the outside to the electrolysis tank. Because of this, the water softening system according to the present disclosure can suppress adhesion of sticking objects originating from the hardness component in the electrolysis tank or the water softening tank. That is, the water softening system according to the present disclosure can maintain the performance of water softening treatment or regenerating treatment for a relatively long period of time.

Hereinafter, exemplary embodiments of the present disclosure will be described with reference to the drawings.

First Exemplary Embodiment

First, a configuration of water softening system 101 according to a first exemplary embodiment of the present invention will be described with reference to FIG. 1. FIG. 1 is a conceptual diagram showing a configuration of water softening system 101 according to the first exemplary embodiment of the present disclosure. FIG. 1 conceptually shows each element of water softening system 101.

Water softening system 101 is a system for generating neutral soft water that can be used as domestic water from city water (raw water containing a hardness component) supplied from the outside.

Specifically, as shown in FIG. 1, water softening system 101 includes inflow port 102 for raw water from the outside, water softening tank 103, neutralization tank 104, water take-out port 105 for treated soft water, and regeneration apparatus 106. Regeneration apparatus 106 includes electrolysis tank 112, treatment tank 113, water pump 114, and filtration part 129 as a separation tank.

Inflow port 102 is connected to city water. Water softening system 101 allows water after water softening treatment to be taken out from water take-out port 105 by the pressure of city water.

The path from inflow port 102 to water take-out port 105 is connected by channel 107, channel 108, and channel 109. Channel 107 connects inflow port 102 to water softening tank 103. Channel 108 connects water softening tank 103 to neutralization tank 104. Channel 109 connects neutralization tank 104 to water take-out port 105.

In other words, channel 107 guides raw water containing a hardness component from inflow port 102 to water softening tank 103. Channel 108 guides raw water softened in water softening tank 103 to neutralization tank 104. Channel 109 guides soft water neutralized by neutralization tank 104 to water take-out port 105.

That is, in water softening system 101, in the water softening treatment, city water supplied from the outside flows through inflow port 102, channel 107, water softening tank 103, channel 108, neutralization tank 104, channel 109, and water take-out port 105 in this order, and is discharged as neutral soft water.

Water softening tank 103 is filled with weakly acidic cation exchange resin 110, and neutralization tank 104 is filled with weakly basic anion exchange resin 111.

Here, weakly acidic cation exchange resin 110 is not particularly limited, and ones for general purposes can be used. Examples thereof include a resin having a carboxyl group (—COOH) as an exchange group. A resin in which a hydrogen ion (H+) as a counter ion of a carboxyl group is a cation such as a metal ion or an ammonium ion (NH4+) may also be used.

Weakly basic anion exchange resin 111 is not particularly limited, and ones for general purposes can be used. Examples thereof include a resin in free-base ion form.

Water softening tank 103 softens raw water containing a hardness component by the action of weakly acidic cation exchange resin 110. More specifically, water softening tank 103 is provided with weakly acidic cation exchange resin 110 having a hydrogen ion at the terminal of the functional group. Water softening tank 103 exchanges cations (calcium ion, magnesium ion) which are hardness components contained in flowing water (raw water) with hydrogen ions to allow the hardness of the raw water to decrease and the raw water to be softened. In addition, because the terminal of the functional group of weakly acidic cation exchange resin 110 is a hydrogen ion, weakly acidic cation exchange resin 110 can be regenerated using acidic electrolyzed water in the regeneration treatment described later.

The raw water containing a hardness component passes from channel 107 to water softening tank 103, and passes through weakly acidic cation exchange resin 110 filling inside water softening tank 103, thereby passing to neutralization tank 104 via channel 108 as soft water. However, the soft water treated with weakly acidic cation exchange resin 110 contains a large amount of hydrogen ions that have been exchanged for the hardness component.

Neutralization tank 104 neutralizes the pH of the soft water (acidified soft water) containing hydrogen ions that has come out of water softening tank 103 by the action of weakly basic anion exchange resin 111, and converts the soft water into neutral water (neutral soft water). More specifically, neutralization tank 104 is provided with weakly basic anion exchange resin 111, and adsorbs hydrogen ions contained in soft water from water softening tank 103 with anions, thereby reducing the pH of the soft water to obtain neutral soft water. In addition, because the terminal of the functional group of weakly basic anion exchange resin 111 is an anion, weakly basic anion exchange resin 111 can be regenerated using alkaline electrolyzed water in the regeneration treatment described later.

Soft water containing hydrogen ions passes through neutralization tank 104 from channel 108, and passes through weakly basic anion exchange resin 111 filling inside neutralization tank 104, whereby the acidified soft water that has come out of water softening tank 103 is neutralized, and the soft water passes to the outside via channel 109 as neutral soft water.

Regeneration apparatus 106 is a device for regenerating weakly acidic cation exchange resin 110 of water softening tank 103 and regenerating weakly basic anion exchange resin 111 of neutralization tank 104. Specifically, as described above, regeneration apparatus 106 includes electrolysis tank 112, treatment tank 113, water pump 114, and filtration part 129. Regeneration apparatus 106 is connected to channel 107, channel 108, and channel 109, which connect the path from inflow port 102 to water take-out port 105, by first supply channel 116, first recovery channel 117, and second supply channel 118 and second recovery channel 119, respectively, to form circulation channel 115 (first circulation channel 115a, second circulation channel 115b) described later.

Electrolysis tank 112 applies electrolysis to the entering water (water supplied from treatment tank 113) using electrode 133 provided inside, thereby generating acidic electrolyzed water and alkaline electrolyzed water, and discharges them. Specifically, electrolysis tank 112 supplies acidic electrolyzed water to water softening tank 103 via first supply channel 116 and supplies alkaline electrolyzed water to neutralization tank 104 via second supply channel 118. Although details will be described later, the acidic electrolyzed water generated by electrolysis tank 112 is used for regenerating weakly acidic cation exchange resin 110 of water softening tank 103, and the alkaline electrolyzed water generated by electrolysis tank 112 is used for regenerating weakly basic anion exchange resin 111 of neutralization tank 104.

Treatment tank 113 is a tank or a container provided with air vent valve 132. Treatment tank 113 secures and stores water to be circulated in circulation channel 115 when weakly acidic cation exchange resin 110 and weakly basic anion exchange resin 111 are regenerated. In addition, the treatment tank 113 mixes acidic electrolyzed water containing a hardness component that has flowed through water softening tank 103 and alkaline electrolyzed water containing anions that has flowed through neutralization tank 104, and supplies the mixture to electrolysis tank 112. In treatment tank 113, a reaction product (reaction product originating from the hardness component contained in raw water) is generated by the reaction between the mixed hardness component and alkaline electrolyzed water.

More specifically, acidic electrolyzed water containing a hardness component after weakly acidic cation exchange resin 110 in water softening tank 103 is regenerated passes through treatment tank 113 via first recovery channel 117. In addition, alkaline electrolyzed water containing anions after weakly basic anion exchange resin 111 in neutralization tank 104 is regenerated passes through treatment tank 113 via second recovery channel 119. Then, in treatment tank 113, the acidic electrolyzed water containing a hardness component and the alkaline electrolyzed water containing anions are mixed, and the hardness component reacts with the alkaline electrolyzed water. For example, when the hardness component in the acidic electrolyzed water is calcium ions, a reaction in which calcium carbonate is generated or calcium hydroxide is generated occurs by mixing the calcium ions with the alkaline electrolyzed water. Then, the reacted hardness component can be separated as a reaction product.

Note that "hardness component reacts" includes not only a state in which all the hardness component reacts but also a state in which a component that does not react or a component that does not exceed the solubility product is contained in treatment tank 113.

Then, the treated water obtained by the reaction of the hardness component in treatment tank 113 passes to electrolysis tank 112, is electrolyzed in electrolysis tank 112, becomes acidic electrolyzed water and alkaline electrolyzed water, and they are supplied to water softening tank 103 and neutralization tank 104, respectively. Then, the acidic electrolyzed water and the alkaline electrolyzed water are reused in water softening tank 103 and neutralization tank 104, respectively, and thereafter pass (recovered) into treatment tank 113 again. Therefore, the acidic electrolyzed water and the alkaline electrolyzed water used for the regeneration of weakly acidic cation exchange resin 110 and the regeneration of weakly basic anion exchange resin 111, which are conventionally discarded, can be reused in the present exemplary embodiment. In addition, because water in which the hardness component has reacted is reused, it is possible to suppress a reduction in regeneration efficiency when weakly acidic cation exchange resin 110 is regenerated.

Water pump 114 is a device for circulating water in circulation channel 115 during the regeneration treatment by regeneration apparatus 106. Water pump 114 is provided in water delivery channel 127 that communicatively connects treatment tank 113 and electrolysis tank 112. The water pump 114 is preferably disposed at a position on the upstream side of electrolysis tank 112 and on the downstream side of treatment tank 113. Such a disposition is adopted because one water pump 114 can easily circulate water to first circulation channel 115a and second circulation channel 115b described later.

Filtration part 129 is provided at a front stage of water delivery channel 127 connected from treatment tank 113 to electrolysis tank 112. Filtration part 129 separates the reaction product (reaction product produced by reaction between the acidic electrolyzed water containing a hardness component that has flowed through water softening tank 103 and the alkaline electrolyzed water containing anions that has flowed through neutralization tank 104) contained in the water that has flowed through treatment tank 113.

The form of filtration part 129 is not limited as long as the reaction product from the hardness component in treatment tank 113 can be separated. Examples thereof include a form of a filtration layer using a granular filter material, a cyclone-type solid-liquid separator, and a hollow fiber membrane.

The granular filter material used for the filtration layer is intended to capture and remove hardness components, but it is also possible to remove particles having a surface potential to be adsorbed to the granular filter material, particles having a particle size of about 1 $\mu$m to 10 $\mu$m or chromaticity depending on the existence state of ions and the like in raw water. As the granular filter material, a filter material suitable for an object to be removed, such as filtration sand, a pellet fiber filter material, or the like, can be used. The material of the granular filter material may be, for example, a material having hardness that is likely to settle in water and is less likely to be deformed by pressure, such as sand, anthracite, garnet, ceramics, granular activated carbon, iron oxyhydroxide, or manganese sand. The particle size may be, for example, 0.3 mm to 5.0 mm, having an equivalent coefficient of 1.2 to 2.0.

Multilayer filtration method in which a plurality of types of filter materials having different specific gravities are mixed and used is a method in which particles having different sizes are layered in order from smallest particles to largest from the bottom as a layer for filtration. In the multilayer filtration method, particles having a large specific gravity and a small size and particles having a small specific gravity and a large size are usually mixed to form a multilayer structure. The multilayer filtration method is preferable because there are advantages such as high filtration efficiency per unit volume and low head loss as compared with a case where a single kind of filter material is used. As a granular filter material, for example, garnet having a particle size of 0.3 mm, sand having a particle size of 0.6 mm, and anthracite having a particle size of 1.0 mm are mixed at 2:1:1 and used, and it is desirable to adjust the mixing ratio and the particle size in accordance with the particle characteristics of the turbid substances.

On the other hand, a cyclone-type solid-liquid separator is an apparatus that classifies and separates water containing a hardness component flowing out of treatment tank 113 into raw water containing small-sized crystals and raw water containing large-sized crystals using centrifugal force instead of gravity.

Figure 2:
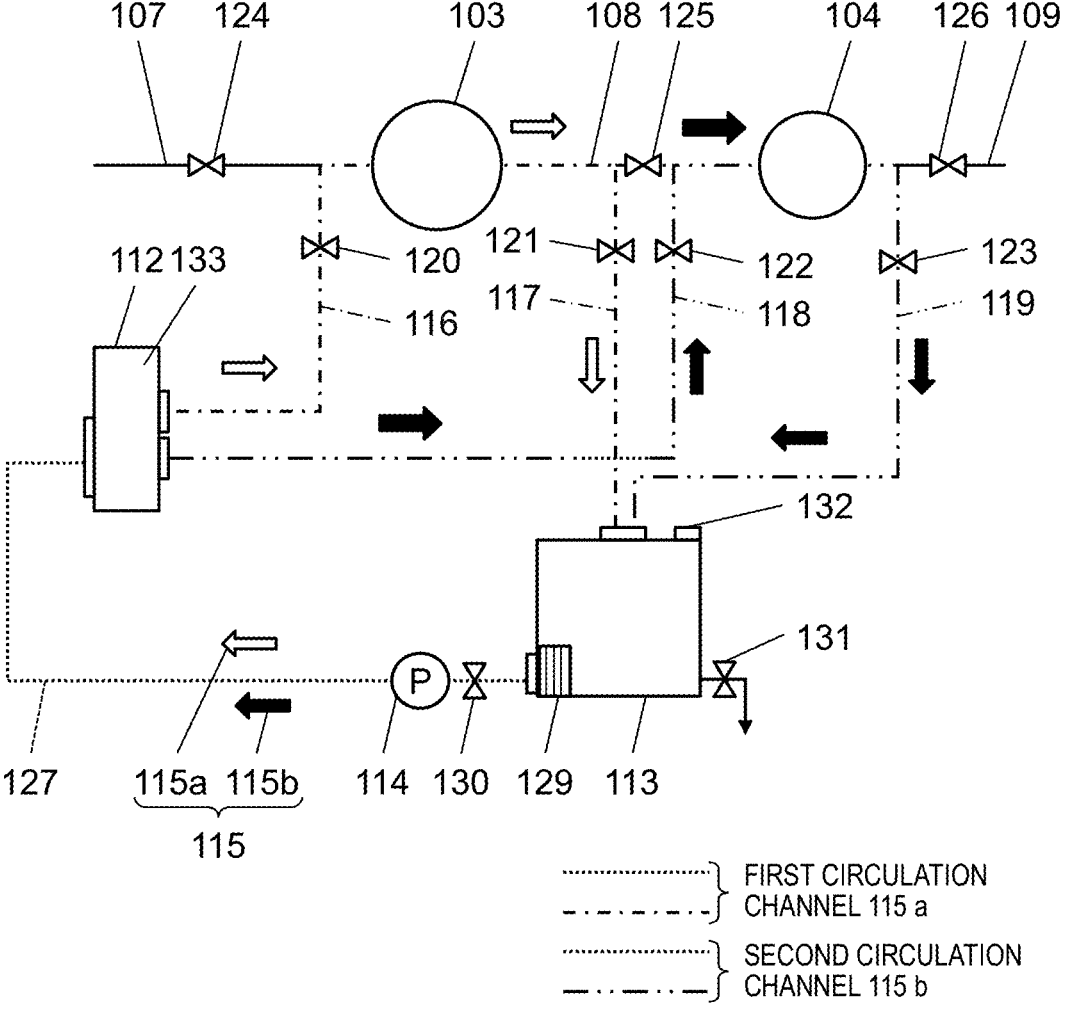
FIG. 2 is a diagram showing a circulation channel of the water softening system.

Next, circulation channel 115 of water softening system 101 will be described with reference to FIG. 2 and FIG. 3. FIG. 2 is a diagram showing circulation channel 115 of water softening system 101. FIG. 3 is a diagram showing a state of water softening system 101 in operation.

Although the description overlaps, in water softening system 101, electrolysis tank 112 and treatment tank 113 included in regeneration apparatus 106 are communicably connected by water delivery channel 127 as shown in FIG. 2. Electrolysis tank 112 and treatment tank 113 are communicably connected to channel 107, channel 108, and channel 109, which connect the path from inflow port 102 to water take-out port 105, by first supply channel 116, first recovery channel 117, and second supply channel 118 and second recovery channel 119, respectively. In regeneration apparatus 106, circulation channel 115 is formed.

First supply channel 116 supplies acidic electrolyzed water from electrolysis tank 112 to water softening tank 103. That is, water softening system 101 includes first supply channel 116 that can draw out acidic electrolyzed water from electrolysis tank 112 and supply the acidic electrolyzed water to the upstream side of water softening tank 103. First supply channel 116 is provided with on-off valve 120.

First recovery channel 117 is for recovering water containing a hardness component that has passed through water softening tank 103 into treatment tank 113. That is, water softening system 101 includes first recovery channel 117 that enables the upstream side of treatment tank 113 to be connected to the downstream side of water softening tank 103. First recovery channel 117 is provided with on-off valve 121.

Second supply channel 118 supplies alkaline electrolyzed water from electrolysis tank 112 to neutralization tank 104. That is, water softening system 101 includes second supply channel 118 that can draw out alkaline electrolyzed water from electrolysis tank 112 and supply the alkaline electrolyzed water to the upstream side of neutralization tank 104. Second supply channel 118 is provided with on-off valve 122.

Second recovery channel 119 is for recovering water that have passed through neutralization tank 104 into treatment tank 113. That is, water softening system 101 includes second recovery channel 119 that enables the upstream side of treatment tank 113 to be connected to the downstream side of neutralization tank 104. Second recovery channel 119 is provided with on-off valve 123.

Circulation channel 115 includes first circulation channel 115a running through water softening tank 103 and second circulation channel 115b running through neutralization tank 104.

As shown in FIG. 2 (white arrows), first circulation channel 115a is a channel in which water sent out from treatment tank 113 by water pump 114 flows through electrolysis tank 112 and water softening tank 103 and returns to treatment tank 113 to circulate. More specifically, first circulation channel 115a is a channel in which water sent out from treatment tank 113 by water pump 114 flows and circulates through water delivery channel 127, electrolysis tank 112, first supply channel 116 (on-off valve 120), water softening tank 103, first recovery channel 117 (on-off valve 121), and treatment tank 113 in this order.

As shown in FIG. 2 (black arrows), second circulation channel 115b is a channel in which water sent out from treatment tank 113 by water pump 114 flows through electrolysis tank 112 and neutralization tank 104 and returns to treatment tank 113 to circulate. More specifically, second circulation channel 115b is a channel in which water sent out from treatment tank 113 by water pump 114 flows and circulates through water delivery channel 127, electrolysis tank 112, second supply channel 118 (on-off valve 122), neutralization tank 104, second recovery channel 119 (on-off valve 123), and treatment tank 113 in this order.

Here, to circulate water (treated water) in circulation channel 115, channel 107 is provided with on-off valve 124 on the downstream side of inflow port 102. Closing on-off valve 124 and opening on-off valve 120 forms a state in which first supply channel 116 is communicably connected to the upstream side of water softening tank 103. This allows water softening system 101 to supply the acidic electrolyzed water from electrolysis tank 112 to water softening tank 103.

Channel 108 is provided with on-off valve 125 at a position on the downstream side of first recovery channel 117 and on the upstream side of second supply channel 118. Closing on-off valve 125 and opening on-off valve 121 forms a state in which first recovery channel 117 is communicatively connected to the downstream side of water softening tank 103. This allows the water (acidic electrolyzed water containing a hardness component) that has flowed through water softening tank 103 to be recovered into treatment tank 113.

Closing on-off valve 125 and opening on-off valve 122 forms a state in which second supply channel 118 is communicatively connected to the upstream side of neutralization tank 104. This allows water softening system 101 to supply the alkaline electrolyzed water from the electrolysis tank 112 to neutralization tank 104.

Channel 109 is provided with on-off valve 126 on the downstream side of neutralization tank 104. Closing on-off valve 126 and opening on-off valve 123 forms a state in which second recovery channel 119 is communicatively connected to the downstream side of neutralization tank 104. This allows the water (alkaline electrolyzed water containing anions) that has passed through second recovery channel 119 to be recovered into treatment tank 113.

Water delivery channel 127 is provided with on-off valve 130 on the downstream side of treatment tank 113 (position between treatment tank 113 and water pump 114). By opening on-off valve 130, the circulation of water to circulation channel 115 can start. On the other hand, by closing on-off valve 130, the circulation of water to circulation channel 115 can stop.

Next, the water softening treatment and the regenerating treatment in water softening system 101 will be described.

In the water softening treatment and the regenerating treatment, as shown in FIG. 3, a control unit (not shown) included in water softening system 101 controls to switch on-off valve 120, on-off valve 121, on-off valve 122, on-off valve 123, on-off valve 124, on-off valve 125, on-off valve 126, on-off valve 130, on-off valve 131, electrode 133 of electrolysis tank 112, and water pump 114 so that their flowing states are formed. The control unit includes, for example, a computer system including a processor and a memory. With the processor executing a program stored in the memory, the computer system functions as the control unit. Here, the program executed by the processor is assumed to be recorded in advance in the memory of the computer system. The program may be provided by being recorded in a non-temporary recording medium such as a memory card, or may be provided through a telecommunication line such as the Internet.

Here, "ON" in FIG. 3 individually indicate a state in which the corresponding on-off valve is "open", a state in which electrode 133 is energized, or a state in which water pump 114 is operating. Blanks indicate a state in which the corresponding on-off valve is "closed", a state in which electrode 133 is not energized, or a state in which water pump 114 is stopped. On-off valve 120, on-off valve 121, on-off valve 122, on-off valve 123, on-off valve 124, on-off valve 125, on-off valve 126, and on-off valve 130 correspond to "on-off valves" according to the present disclosure.

<Water Softening Treatment>

First, an operation at the time of water softening treatment by water softening system 101 will be described with reference to the column "IN WATER SOFTENING" in FIG. 3.

As shown in FIG. 3, water softening system 101 opens on-off valve 126 provided in water take-out port 105 in a state where on-off valve 124 and on-off valve 125 are open in the water softening treatment (at the time of water softening). This allows water softening system 101 to cause city water (raw water containing a hardness component) to flow through water softening tank 103 and neutralization tank 104 from the outside, and therefore allows the softened water (neutral soft water) to be taken out from water take-out port 105. At this time, all of on-off valve 120, on-off valve 121, on-off valve 122, on-off valve 123, and on-off valve 130 are in a closed state. Electrode 133 of electrolysis tank 112 and water pump 114 are also stopped.

Specifically, as shown in FIG. 2, in the water softening treatment, raw water to be supplied is supplied from inflow port 102 to water softening tank 103 through channel 107 by the pressure of city water. The raw water supplied to water softening tank 103 flows through weakly acidic cation exchange resin 110 provided in water softening tank 103. At this time, cations as the hardness component in the raw water are adsorbed by the action of weakly acidic cation exchange resin 110, and hydrogen ions are released (ion exchange is performed). Then, cations are removed from the raw water, whereby the raw water is softened. The softened water further passes through channel 108 and proceeds to neutralization tank 104. In neutralization tank 104, hydrogen ions contained in the softened water are adsorbed by the action of weakly basic anion exchange resin 111. That is, because hydrogen ions are removed from the soft water after the treatment, the lowered pH increases, and neutral water softened as domestic water can be taken out from water take-out port 105.

<Regeneration Treatment>

Next, an operation at the time of the regeneration treatment by regeneration apparatus 106 of water softening system 101 will be described sequentially with reference to the columns of "IN WATER INJECTION", "IN REGENERATION", and "IN DRAINING" in FIG. 3.

When water softening tank 103 filled with weakly acidic cation exchange resin 110 is continuously used, the cation exchange capacity decreases or disappears. That is, ion exchange cannot be performed after all the hydrogen ions, which are functional groups of the cation exchange resin, are exchanged for calcium ions or magnesium ions, which are hardness components. Therefore, in water softening system 101, a regeneration treatment for water softening tank 103 and neutralization tank 104 is performed by regeneration apparatus 106 at predetermined time intervals.

First, as shown in FIG. 3, at the time of water injection, that is, at the initial stage of regeneration of water softening tank 103 and neutralization tank 104 by regeneration apparatus 106, water softening system 101 opens on-off valve 124 and on-off valve 121. This causes water softening system 101 to introduce the raw water into treatment tank 113 from inflow port 102 through water softening tank 103 by the pressure of city water. At this time, on-off valve 120, on-off valve 125, on-off valve 130, and on-off valve 131 are closed. By storing a predetermined amount of water in treatment tank 113, regeneration apparatus 106 can secure the amount of water at the time of regeneration.

Next, at the time of regeneration, when on-off valve 124 and on-off valve 126 are closed and on-off valve 120, on-off valve 121, on-off valve 122, on-off valve 123, and on-off valve 130 are open, to form first circulation channel 115a and second circulation channel 115b as shown in FIG. 2.

When electrode 133 of electrolysis tank 112 and water pump 114 operate, the water stored in treatment tank 113 circulates through each of first circulation channel 115a and second circulation channel 115b.

At this time, the acidic electrolyzed water generated in electrolysis tank 112 is supplied into water softening tank 103 through first supply channel 116, and flows through weakly acidic cation exchange resin 110 inside water softening tank 103. That is, flowing of the acidic electrolyzed water through weakly acidic cation exchange resin 110 causes cations (hardness component) adsorbed to weakly acidic cation exchange resin 110 to undergo an ion exchange reaction with hydrogen ions contained in the acidic electrolyzed water. This allows weakly acidic cation exchange resin 110 to regenerate. Thereafter, the acidic electrolyzed water that has flowed through weakly acidic cation exchange resin 110 contains cations and flows into first recovery channel 117. That is, the acidic electrolyzed water containing cations that has flowed through weakly acidic cation exchange resin 110 is recovered into treatment tank 113 via first recovery channel 117.

On the other hand, the alkaline electrolyzed water generated in electrolysis tank 112 is supplied into neutralization tank 104 through second supply channel 118, and flows through weakly basic anion exchange resin 111 inside neutralization tank 104. That is, flowing of the alkaline electrolyzed water through weakly basic anion exchange resin 111 causes anions adsorbed to the weakly basic anion exchange resin 111 to undergo an ion exchange reaction with hydroxide ions contained in the alkaline electrolyzed water. This allows weakly basic anion exchange resin 111 to regenerate. Thereafter, the alkaline electrolyzed water that has flowed through weakly basic anion exchange resin 111 contains anions and flows into second recovery channel 119. That is, the alkaline electrolyzed water containing anions that has flowed through weakly basic anion exchange resin 111 is recovered into treatment tank 113 via second recovery channel 119.

Then, in treatment tank 113, the acidic electrolyzed water containing cations recovered from water softening tank 103 and the alkaline electrolyzed water containing anions recovered from neutralization tank 104 are mixed. At this time, in treatment tank 113, the hardness component which is cations in the acidic electrolyzed water reacts with the alkaline electrolyzed water. For example, when the hardness component in the acidic electrolyzed water is calcium ions, calcium hydroxide is generated by the alkaline electrolyzed water, or calcium carbonate is generated from bond between calcium ions and carbonate ions existing in water.

Thereafter, when the water treated in treatment tank 113 flows through filtration part 129, the reaction product is removed, and the water passes through electrolysis tank 112 again via water delivery channel 127. Then, the passed water is electrolyzed again in electrolysis tank 112.

Here, the electrolyzed water (acidic electrolyzed water, alkaline electrolyzed water) electrolyzed again in electrolysis tank 112 is used for regeneration of weakly acidic cation exchange resin 110 and regeneration of weakly basic anion exchange resin 111, respectively. That is, the acidic electrolyzed water used for regenerating weakly acidic cation exchange resin 110 is reused as an electrolyzed water again in treatment tank 113 from a state where the hardness component is changed into a reaction product and filtered. In addition, in the electrolytic acidic water to be reused, the hardness component contained in the water is reduced as compared with the case of city water (raw water containing a hardness component) from the outside or the case where treatment tank 113 is not provided. When electrolysis is performed in electrolysis tank 112, the hardness component which is cations is electrolyzed into the alkaline electrolyzed water, and therefore the hardness of the acidic electrolyzed water decreases, and a decrease in regeneration efficiency can be suppressed. Furthermore, it is possible to suppress adhesion of sticking objects originating from the hardness component inside electrolysis tank 112 and water softening tank 103.

Finally, when the regeneration process is completed (at the time of draining), the energization of electrode 133 of electrolysis tank 112 is stopped, and the operation of water pump 114 is stopped. Opening on-off valve 131 causes the water in treatment tank 113 to be drained to the outside by the action of air vent valve 132.

As described above, in water softening system 101, the water softening treatment and the regenerating treatment are repeatedly performed.

According to water softening system 101 of the first exemplary embodiment described above, the following effects can be obtained.

(1) Water softening system 101 includes water softening tank 103 for softening raw water containing a hardness component with weakly acidic cation exchange resin 110, neutralization tank 104 for neutralizing a pH of soft water that has flowed through water softening tank 103 with weakly basic anion exchange resin 111, electrolysis tank 112 for generating acidic electrolyzed water for regenerating weakly acidic cation exchange resin 110 of water softening tank 103 and alkaline electrolyzed water for regenerating weakly basic anion exchange resin 111 of neutralization tank 104, and treatment tank 113 for mixing the acidic electrolyzed water that has flowed through water softening tank 103 and the alkaline electrolyzed water that has flowed through neutralization tank 104 and supplying the mixture of the acidic electrolyzed water and the alkaline electrolyzed water to electrolysis tank 112.

This allows water softening system 101 to generate neutral soft water that can be used as domestic water from city water (raw water containing a hardness component) supplied from the outside, by water softening tank 103 and neutralization tank 104. On the other hand, water softening system 101 can regenerate weakly acidic cation exchange resin 110 of water softening tank 103 and weakly basic anion exchange resin 111 of neutralization tank 104 by electrolysis tank 112 and treatment tank 113, respectively. Therefore, water softening system 101 can maintain the water softening performance for a relatively long period of time. That is, water softening system 101 using weakly acidic cation exchange resin 110 can generate neutral soft water that can be used as domestic water, and can maintain the performance for a relatively long period of time by the regeneration treatment.

(2) Water softening system 101 includes first supply channel 116 capable of drawing the acidic electrolyzed water from electrolysis tank 112 and delivering the acidic electrolyzed water to an upstream side of water softening tank 103, second supply channel 118 capable of drawing the alkaline electrolyzed water from electrolysis tank 112 and delivering the alkaline electrolyzed water to an upstream side of neutralization tank 104, first recovery channel 117 capable of connecting an upstream side of treatment tank 113 to a downstream side of water softening tank 103, and second recovery channel 119 capable of connecting the upstream side of treatment tank 113 to a downstream side of neutralization tank 104. In the water softening treatment, by switching of each on-off valve, the water softening system 101 causes the raw water supplied from the outside to flow through water softening tank 103 and the neutralization tank 104 in this order and discharges the raw water. In the regeneration treatment, by switching of the on-off valves, water softening system 101 supplies water in treatment tank 113 from electrolysis tank 112 to water softening tank 103 through first supply channel 116, recovers water that has flowed through water softening tank 103 into treatment tank 113 through first recovery channel 117, supplies water in treatment tank 113 from electrolysis tank 112 to neutralization tank 104 through second supply channel 118, and recovers water that has flowed through neutralization tank 104 into treatment tank 113 through second recovery channel 119. This allows water softening system 101 to easily switch between the water softening treatment and the regenerating treatment and perform the treatments.

(3) In water softening system 101, treatment tank 113 generates a reaction product (a reaction product originating from a hardness component contained in the raw water) by a reaction between the acidic electrolyzed water that has flowed through water softening tank 103 and the alkaline electrolyzed water that has flowed through neutralization tank 104, and filtration part 129 for separating the reaction product contained in water flowed through treatment tank 113 is provided between treatment tank 113 and electrolysis tank 112.

This allows water softening system 101 to reliably separate the reaction product from the water supplied from treatment tank 113 to electrolysis tank 112 in the regeneration treatment. Therefore, the hardness component contained in the water supplied from treatment tank 113 to electrolysis tank 112 decreases as compared with the case where raw water containing a hardness component is supplied from the outside to electrolysis tank 112. As a result, water softening system 101 can suppress adhesion of sticking objects originating from the hardness component in electrolysis tank 112 or water softening tank 103. That is, water softening system 101 can maintain the performance of the water softening treatment or the regeneration treatment for a relatively long period of time.

Second Exemplary Embodiment

Water softening system 101a according to a second exemplary embodiment of the present disclosure is different from water softening system 101 according to the first exemplary embodiment in that neutralization tank 104 includes first neutralization tank 104a and second neutralization tank 104b, and that the water softening system includes raw water supply channel 137. Other configurations of water softening system 101a are the same as those of water softening system 101 according to the first exemplary embodiment. Hereinafter, the description of the contents already described in the first exemplary embodiment will be omitted as appropriate, and differences from the first exemplary embodiment will be mainly described.

Figure 4:
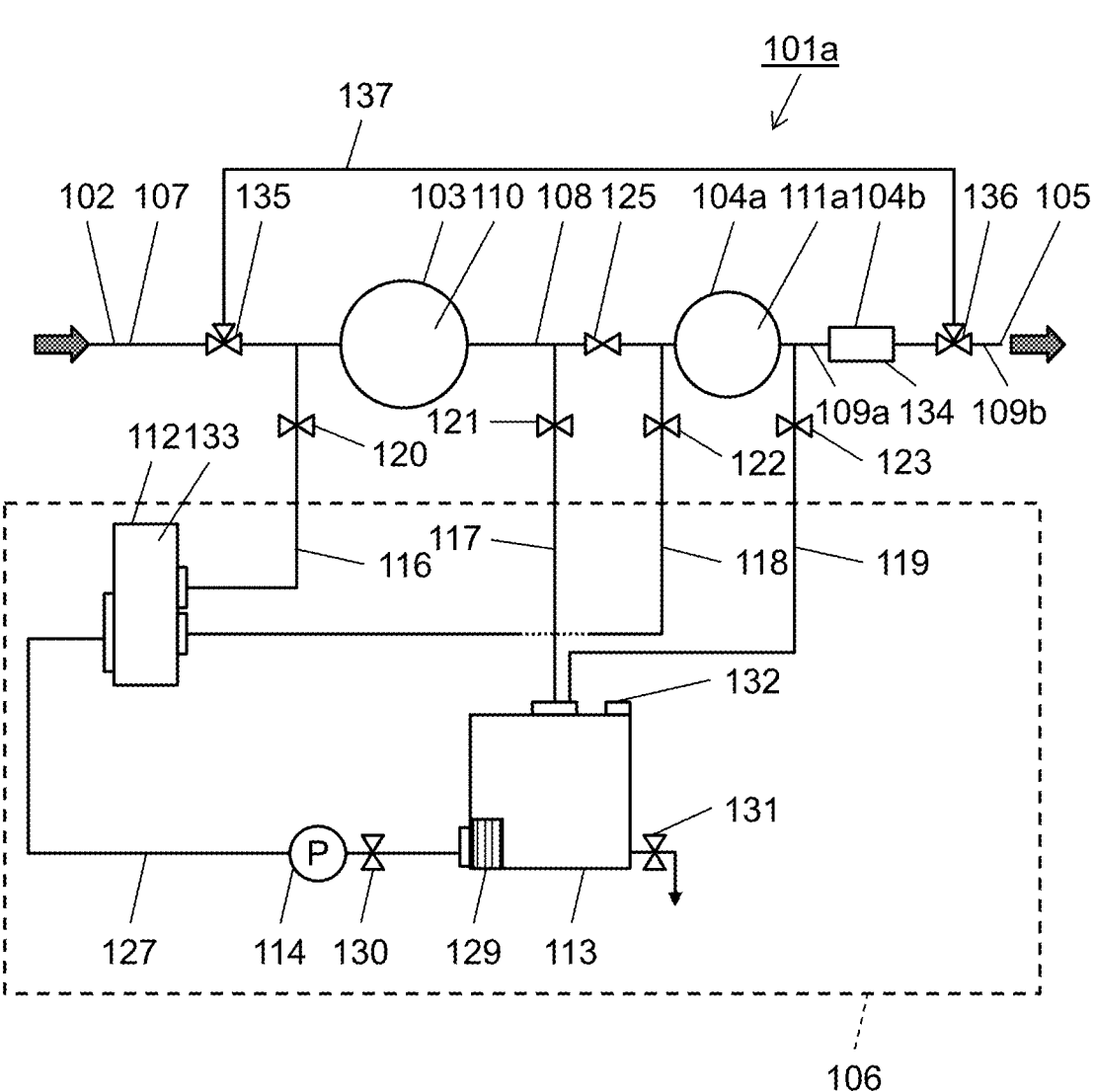
FIG. 4 is a conceptual diagram showing a configuration of a water softening system according to a second exemplary embodiment of the present disclosure.

First, a configuration of water softening system 101a according to the second exemplary embodiment of the present disclosure will be described with reference to FIG. 4. FIG. 4 is a conceptual diagram showing a configuration of water softening system 101a according to the second exemplary embodiment of the present disclosure.

As with water softening system 101 according to the first exemplary embodiment, water softening system 101a is a system for generating neutral soft water that can be used as domestic water from city water (raw water containing a hardness component) supplied from the outside.

Specifically, as shown in FIG. 4, water softening system 101a includes inflow port 102 for raw water from the outside, water softening tank 103, first neutralization tank 104a, second neutralization tank 104b, take-out port 105 for treated soft water, regeneration apparatus 106, and raw water supply channel 137. The configuration of regeneration apparatus 106 is the same as that of water softening system 101 according to the first exemplary embodiment.

Inflow port 102 is connected to city water. Water softening system 101a allows water after water softening treatment to be taken out from water take-out port 105 by the pressure of city water.

The path from inflow port 102 to water take-out port 105 is connected by channel 107, channel 108, channel 109a, and channel 109b. Channel 107 connects inflow port 102 to water softening tank 103. Channel 108 connects water softening tank 103 and first neutralization tank 104a. Channel 109a connects first neutralization tank 104a to second neutralization tank 104b. Channel 109b connects second neutralization tank 104b to water take-out port 105.

In other words, channel 107 guides raw water containing a hardness component from inflow port 102 to water softening tank 103. Channel 108 guides raw water softened in water softening tank 103 to first neutralization tank 104a. Channel 109a guides soft water neutralized by first neutralization tank 104a to second neutralization tank 104b. Channel 109b guides soft water neutralized by second neutralization tank 104b to water take-out port 105.

That is, in water softening system 101a, in the water softening treatment, city water supplied from the outside flows through inflow port 102, channel 107, water softening tank 103, channel 108, first neutralization tank 104a, channel 109a, second neutralization tank 104b, channel 109b, and water take-out port 105 in this order, and is discharged as neutral soft water.

Water softening tank 103 is filled with weakly acidic cation exchange resin 110, and first neutralization tank 104a is filled with weakly basic anion exchange resin 111. Second neutralization tank 104b is provided with Venturi tube 134.

Water softening tank 103 softens raw water containing a hardness component by the action of weakly acidic cation exchange resin 110. Details are the same as those of water softening system 101 according to the first exemplary embodiment.

The raw water containing a hardness component passes from channel 107 to water softening tank 103, and passes through weakly acidic cation exchange resin 110 filling inside water softening tank 103, thereby passing from channel 108 to first neutralization tank 104a as soft water. However, the soft water treated with weakly acidic cation exchange resin 110 contains a large amount of hydrogen ions that have been exchanged for the hardness component.

First neutralization tank 104a neutralizes a pH of the soft water (acidified soft water) containing a large amount of hydrogen ions that has come out of water softening tank 103 by the action of weakly basic anion exchange resin 111a, and converts the soft water into weakly acidic water (weakly acidic soft water). Details of the action are the same as those of water softening system 101 according to the first exemplary embodiment, but the required amount of weakly basic anion exchange resin 111a is largely suppressed as compared with water softening system 101. Water softening system 101 neutralizes the acidified soft water that has come out of water softening tank 103 by weakly basic anion exchange resin 111 so that the acidified soft water becomes neutral. However, water softening system 101a neutralizes the acidified soft water by first neutralization tank 104a so that the acidified soft water becomes weakly acidic but not neutral. This reduces, in first neutralization tank 104a, the amount of neutralization required for the acidified soft water that has come out of water softening tank 103. Therefore, the required amount of weakly basic anion exchange resin 111a can be largely suppressed.

Soft water containing a large amount of hydrogen ions is supplied from channel 108 to first neutralization tank 104a, and passes through weakly basic anion exchange resin 111a filled in first neutralization tank 104a, whereby the acidified soft water that has come out of water softening tank 103 is neutralized and passes into second neutralization tank 104b through channel 109a as weakly acidic soft water.

Second neutralization tank 104b neutralizes the pH of the weakly acidic water (weakly acidic soft water) that has come out of first neutralization tank 104a by the action of air aeration by Venturi tube 134, and converts the weakly acidic water into neutral water (neutral soft water). More specifically, second neutralization tank 104b is provided with Venturi tube 134, and a flow of weakly acidic soft water from channel 109a to second neutralization tank 104b causes a pressure change to occur in Venturi tube 134, and external air is sucked. The sucked air is released as microbubbles into the weakly acidic soft water that has come out of first neutralization tank 104a. The weakly acidic soft water that has come out of first neutralization tank 104a contains free carbonic acid. Second neutralization tank 104b releases the free carbonic acid in the soft water into the air by the microbubbles released in the soft water, and further neutralizes the weakly acidic soft water that has come out of first neutralization tank 104a to convert the soft water into neutral water.

Weakly acidic soft water that has come out of first neutralization tank 104a passes through second neutralization tank 104b, and passes through Venturi tube 134 provided therein, whereby the weakly acidic soft water that has come out of first neutralization tank 104a is neutralized and passes to the outside via channel 109b as neutral soft water.

Raw water supply channel 137 is connected to channel 107 and channel 109b, and supplies the raw water that has entered from the inflow port 102 from the channel 107 to the channel 109b by a bypassing manner in the regeneration treatment. The connection portion between raw water supply channel 137 and channel 107 is located at the upstream side of the connection portion between channel 107 and first supply channel 116. There is three-way valve 135 installed at the connection portion between raw water supply channel 137 and channel 107. There is three-way valve 136 installed at the connection portion between raw water supply channel 137 and channel 109b. In the regeneration treatment, by switching three-way valve 135 and three-way valve 136, the raw water entered from inflow port 102 can be taken out from water take-out port 105 via channel 107, raw water supply channel 137, and channel 109*b*. When raw water supply channel 137 is not provided, there is no channel for the raw water supplied from inflow port 102, and water cannot be taken out from water take-out port 105. This is because, in the regeneration treatment, the electrolyzed water to be used for regeneration passes through water softening tank 103 from first supply channel 116 and through first neutralization tank 104*a* from second supply channel 118. On the other hand, because water softening system 101*a* according to the second exemplary embodiment includes raw water supply channel 137, although the soft water cannot be taken out from water take-out port 105, raw water can be taken out from water take-out port 105 even in the regeneration treatment, and the raw water can be used as domestic water.

Regeneration apparatus 106 is the same as that in water softening system 101 according to first exemplary embodiment, but on-off valve 124 and on-off valve 126 included in water softening system 101 are changed to three-way valve 135 and three-way valve 136, respectively. In water softening system 101*a*, closing of on-off valve 124 and on-off valve 126 in water softening system 101 corresponds to switching of three-way valve 135 and three-way valve 136, respectively.

Because the water softening treatment and the regenerating treatment in water softening system 101*a* are the same as those in water softening system 101, the description thereof will be omitted.

According to water softening system 101*a* of the second exemplary embodiment described above, the following effects can be obtained.

(1) Water softening system 101*a* includes water softening tank 103 for softening raw water containing a hardness component with weakly acidic cation exchange resin 110, first neutralization tank 104*a* for neutralizing a pH of soft water that has flowed through water softening tank 103 with weakly basic anion exchange resin 111*a*, second neutralization tank 104*b* for neutralizing soft water that has flowed through first neutralization tank 104*a* by air aeration with Venturi tube 134, electrolysis tank 112 for generating acidic electrolyzed water for regenerating weakly acidic cation exchange resin 110 of water softening tank 103 and alkaline electrolyzed water for regenerating weakly basic anion exchange resin 111*a* of first neutralization tank 104*a*, treatment tank 113 for mixing the acidic electrolyzed water that has flowed through water softening tank 103 and the alkaline electrolyzed water that has flowed through first neutralization tank 104*a* and supplying the mixture of the acidic electrolyzed water and the alkaline electrolyzed water to electrolysis tank 112.

This allows water softening system 101*a* to generate neutral soft water that can be used as domestic water from city water (raw water containing a hardness component) supplied from the outside, by water softening tank 103, first neutralization tank 104*a*, and second neutralization tank 104*b*. On the other hand, water softening system 101*a* can regenerate weakly acidic cation exchange resin 110 of water softening tank 103 and weakly basic anion exchange resin 111*a* of first neutralization tank 104*a* by electrolysis tank 112 and treatment tank 113, respectively. Therefore, water softening system 101*a* can maintain the water softening performance for a relatively long period of time. That is, water softening system 101*a* using weakly acidic cation exchange resin 110 can generate neutral soft water that can be used as domestic water, and can maintain the performance for a relatively long period of time by the regeneration treatment.

(2) Water softening system 101*a* includes first supply channel 116 capable of drawing the acidic electrolyzed water from electrolysis tank 112 and delivering the acidic electrolyzed water to an upstream side of water softening tank 103, second supply channel 118 capable of drawing the alkaline electrolyzed water from electrolysis tank 112 and delivering the alkaline electrolyzed water to an upstream side of neutralization tank 104, first recovery channel 117 capable of connecting an upstream side of treatment tank 113 to a downstream side of water softening tank 103, and second recovery channel 119 capable of connecting the upstream side of treatment tank 113 to a downstream side of neutralization tank 104. In the water softening treatment, by switching of each on-off valve and three-way valve, water softening system 101*a* causes the raw water supplied from the outside to flow through water softening tank 103, first neutralization tank 104*a*, and second neutralization tank 104*b* in this order. In the regeneration treatment, by switching of each on-off valve and three-way valve, water softening system 101*a* supplies water in treatment tank 113 from electrolysis tank 112 to water softening tank 103 through first supply channel 116, recovers water that has flowed through water softening tank 103 into treatment tank 113 through first recovery channel 117, supplies water in treatment tank 113 from the electrolysis tank 112 to first neutralization tank 104*a* through second supply channel 118, and recovers water that has flowed through first neutralization tank 104*a* into the treatment tank 113 through second recovery channel 119. This allows water softening system 101*a* to easily switch between the water softening treatment and the regenerating treatment and perform the treatments.

(3) In water softening system 101*a*, treatment tank 113 generates a reaction product (a reaction product originating from a hardness component contained in the raw water) by a reaction between the acidic electrolyzed water that has flowed through water softening tank 103 and the alkaline electrolyzed water that has flowed through first neutralization tank 104*a*, and filtration part 129 for separating the reaction product contained in water that has flowed through treatment tank 113 is provided between treatment tank 113 and electrolysis tank 112.

This allows water softening system 101*a* to reliably separate the reaction product from the water supplied from treatment tank 113 to electrolysis tank 112 in the regeneration treatment. Therefore, the hardness component contained in the water supplied from treatment tank 113 to electrolysis tank 112 decreases as compared with the case where raw water containing a hardness component is supplied from the outside to electrolysis tank 112. As a result, water softening system 101*a* can suppress adhesion of sticking objects originating from the hardness component in electrolysis tank 112 or water softening tank 103. That is, water softening system 101*a* can maintain the performance of the water softening treatment or the regeneration treatment for a relatively long period of time.

(4) In water softening system 101*a*, the neutralization tank includes first neutralization tank 104*a* for neutralizing the pH of soft water that has flowed through water softening tank 103 with weakly basic anion exchange resin 111*a*, and second neutralization tank 104*b* for neutralizing soft water that has flowed through first neutralization tank 104*a* by air aeration with Venturi tube 134. This reduces, in water softening system 101*a*, the amount of neutralization required for weakly basic anion exchange resin 111*a* as compared with the case where neutralization is performed only with weakly basic anion exchange resin 111 like in water softening system 101. Therefore, water softening system 101a can greatly suppress the required amount of weakly basic anion exchange resin 111a. This also means that first neutralization tank 104a provided with weakly basic anion exchange resin 111a can be downsized.

Although the present disclosure is described above based on the first exemplary embodiment and the second exemplary embodiment, the present disclosure is not limited to the above first exemplary embodiment and second exemplary embodiment at all, and it can be easily inferred that various modifications and variations can be made without departing from the scope of the present disclosure.

Water softening system 101a according to the second exemplary embodiment is provided with raw water supply channel 137 for supplying the raw water entering from inflow port 102 from channel 107 to channel 109b in a bypassing manner in the regeneration treatment, but the present invention is not limited to this. For example, in water softening system 101a, raw water supply channel 137 may not be provided as in water softening system 101 according to the first exemplary embodiment, or raw water supply channel 137 may be provided in water softening system 101 according to the first exemplary embodiment. This allows the degree of freedom in designing water softening system 101 or water softening system 101a to improve.

Water softening system 101 according to the first exemplary embodiment and water softening system 101a according to the second exemplary embodiment have been described as being capable of generating neutral soft water. However, water softening system 101 according to the first exemplary embodiment and water softening system 101a according to the second exemplary embodiment are not limited to the configuration for generating neutral water, and may be configured to generate water having a pH with which the water can be used as domestic water, for example, weakly acidic soft water. That is, neutralization tank 104 according to the first exemplary embodiment and first neutralization tank 104a and second neutralization tank 104b according to the second exemplary embodiment may be modified so as to neutralize the acidified soft water that has come out of water softening tank 103 and convert the acidified soft water into soft water having a pH with which the water can be used as domestic water.

Third Exemplary Embodiment

A third exemplary embodiment of the present disclosure relates to a water softening system for obtaining domestic water.

Conventionally, as this kind of water softening system, many systems using a cation exchange resin have been proposed. For example, a water softening system is known in which a cation exchange resin (strongly acidic cation exchange resin) having a sodium ion as a functional group is used, and calcium ions or magnesium ions, which are hardness components contained in raw water, are ion-exchanged with sodium ions to obtain soft water.

Continuous use of the cation exchange resin reduces or eliminates the ion exchange capacity. That is, ion exchange cannot be performed after all the sodium ions, which are functional groups of the cation exchange resin, are exchanged for calcium ions or magnesium ions, which are hardness components. Therefore, it is necessary to regenerate the cation exchange resin in order to enable ion exchange again. As the regeneration treatment, a treatment of causing regenerating water such as saturated saline water to pass through the cation exchange resin is performed. In such a regeneration treatment, it is necessary to replenish salt periodically according to the amount of soft water used, and thus there is a problem that it takes time and effort to replenish salt. In addition, such a regeneration treatment causes an environmental problem because a large amount of salt is used.

Therefore, as a method for regenerating a cation exchange resin without using salt, a method for regenerating a cation exchange resin with acidic electrolyzed water generated by electrolysis (weakly acidic cation exchange resin) has been proposed (see, for example PTLs 1, 2). The weakly acidic cation exchange resin has a proton at a terminal of the functional group, and can exchange calcium ions or magnesium ions contained in raw water with hydrogen ions to obtain soft water. Because this method can perform regeneration by electrolyzed water, automatic regeneration can be performed.

However, in such a water softening system that suppresses a decrease in pH using electrolysis of water, electrolysis is required even at the time of water softening, and the flow rate is small, and the amount of water is insufficient as domestic water, which is inconvenient.

Therefore, an object of the present disclosure is to provide a water softening system capable of removing hardness components in water over a relatively long period of time without performing replacement operation of a weakly acidic cation exchange resin, and capable of securing a flow rate as domestic water.

A water softening system for generating soft water according to the present disclosure includes: a water softening tank for softening raw water containing a hardness component with a weakly acidic cation exchange resin; a neutralization tank for neutralizing a pH of soft water that has passed through the water softening tank by gradually releasing calcium carbonate; an electrolysis tank for generating acidic electrolyzed water for regenerating the weakly acidic cation exchange resin and alkaline electrolyzed water; and a regeneration apparatus for regenerating the weakly acidic cation exchange resin with the acidic electrolyzed water generated by the electrolysis tank, wherein the regeneration apparatus includes a treatment tank for reacting the hardness component discharged from the water softening tank and the alkaline electrolyzed water discharged from the electrolysis tank at the time of regenerating, forms a first supply channel capable of drawing the acidic water from the electrolysis tank and delivering the water to an upstream side of the water softening tank, a recovery channel capable of connecting a downstream side of the water softening tank to an upstream side of the treatment tank, a water delivery channel connecting a downstream side of the treatment tank to an upstream side of the electrolysis tank, a second supply channel capable of drawing alkaline electrolyzed water from the electrolysis tank and delivering the alkaline electrolyzed water to the treatment tank, and a circulation channel for circulating water at the time of regenerating the weakly acidic cation exchange resin, and stores raw water in the treatment tank through the weakly acidic cation exchange resin by switching of on-off valves at an initial stage of regeneration of the weakly acidic cation exchange resin.

The water softening system according to the present disclosure can remove hardness components in water for a relatively long period of time without performing replacement operation of a weakly acidic cation exchange resin, and can also secure a flow rate as domestic water.

A water softening system for generating soft water according to the present disclosure includes: a water softening tank for softening raw water containing a hardness component with a weakly acidic cation exchange resin; a neutralization tank for neutralizing a pH of soft water that has passed through the water softening tank by gradually releasing calcium carbonate; an electrolysis tank for generating acidic electrolyzed water for regenerating the weakly acidic cation exchange resin and alkaline electrolyzed water; and a regeneration apparatus for regenerating the weakly acidic cation exchange resin with the acidic electrolyzed water generated by the electrolysis tank, wherein the regeneration apparatus includes a treatment tank for reacting the hardness component discharged from the water softening tank and the alkaline electrolyzed water discharged from the electrolysis tank at the time of regenerating, forms a first supply channel capable of drawing the acidic water from the electrolysis tank and delivering the water to an upstream side of the water softening tank, a recovery channel capable of connecting a downstream side of the water softening tank to an upstream side of the treatment tank, a water delivery channel connecting a downstream side of the treatment tank to an upstream side of the electrolysis tank, a second supply channel capable of drawing alkaline electrolyzed water from the electrolysis tank and delivering the alkaline electrolyzed water to the treatment tank, and a circulation channel for circulating water at the time of regenerating the weakly acidic cation exchange resin, and stores raw water in the treatment tank through the weakly acidic cation exchange resin by switching of on-off valves at an initial stage of regeneration of the weakly acidic cation exchange resin.

This allows the water softening system according to the present disclosure to generate soft water that can be used as domestic water by the action of the water softening tank and the neutralization tank, and to maintain the performance for a relatively long period of time by the action of the regeneration apparatus.

In addition, the water softening system according to the present disclosure further includes a filtration part for separating the reaction product from the hardness component of the water that has passed through the treatment tank between the treatment tank and the electrolysis tank.

In the treatment tank, acidic electrolyzed water containing cations and alkaline electrolyzed water containing anions are mixed. At this time, in the treatment tank, a hardness component which is cations in the acidic electrolyzed water reacts with the alkaline electrolyzed water. For example, when the hardness component in the acidic electrolyzed water is calcium ions, calcium hydroxide is generated by the alkaline electrolyzed water, or calcium carbonate is generated from bond between calcium ions and carbonate ions existing in water. The water softening system according to the present disclosure can suppress the occurrence of deposition in the electrode and can maintain the electrode performance for a relatively long period of time by separating these calcium hydroxide and calcium carbonate by the filtration part.

Hereinafter, the third exemplary embodiment of the present disclosure will be described with reference to the drawings.

Figure 5:
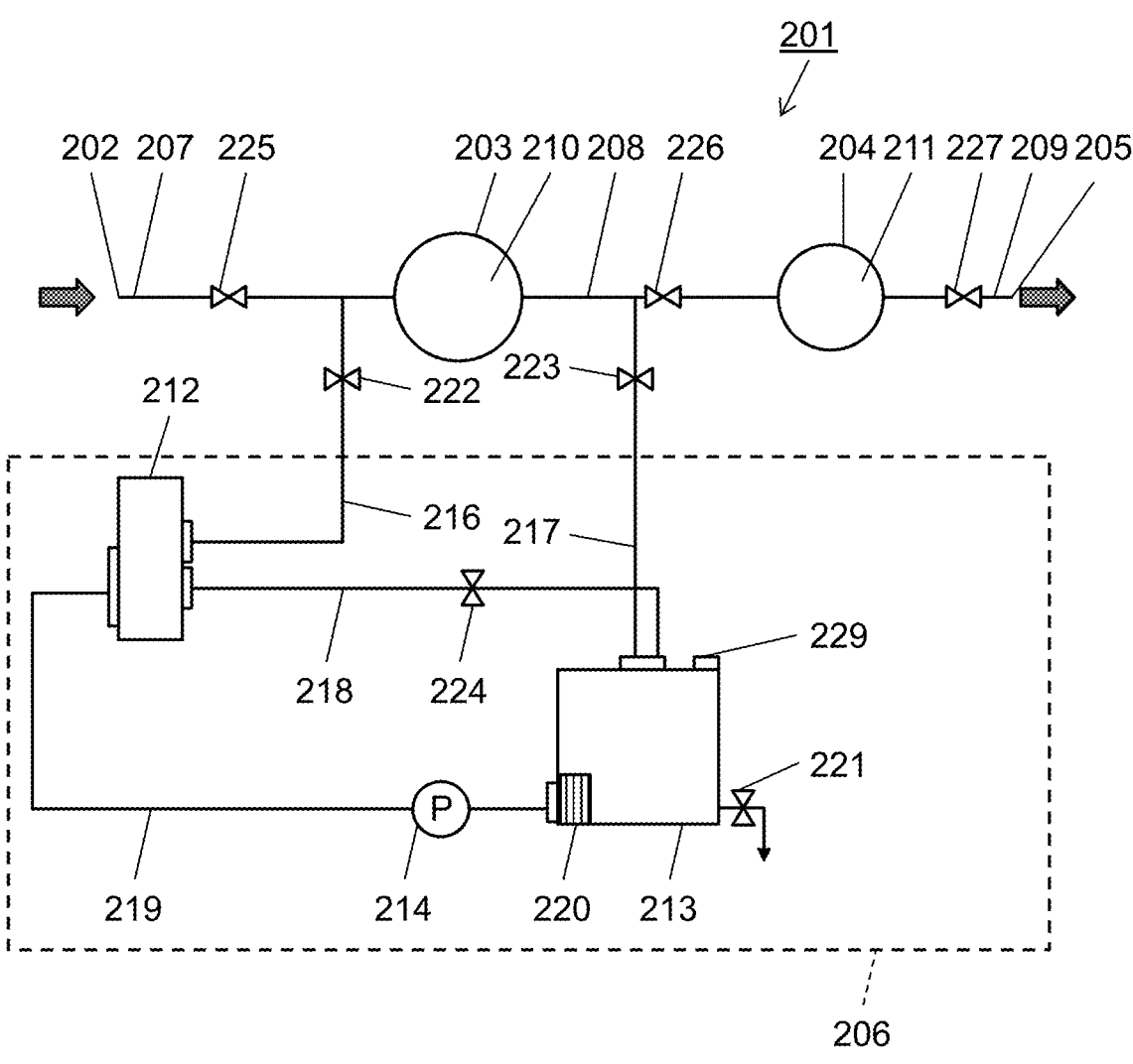
FIG. 5 is a conceptual diagram showing a configuration of a water softening system according to a third exemplary embodiment of the present disclosure.

FIG. 5 is a diagram conceptually showing a configuration of water softening system 201 according to the third exemplary embodiment.

As shown in FIG. 5, water softening system 201 includes inflow port 202 for raw water containing a hardness component, water softening tank 203, neutralization tank 204, water take-out port 205 for treated soft water, and regeneration apparatus 206. Inflow port 202 is connected to city water. Water softening system 201 allows water after water softening treatment to be taken out from water take-out port 205 by the pressure of city water.

The path from inflow port 202 to water take-out port 205 is connected by channel 207, channel 208, channel 209. Channel 207 connects inflow port 202 to water softening tank 203. Channel 208 connects water softening tank 203 to neutralization tank 204. Channel 209 connects neutralization tank 204 to water take-out port 205.

Water softening tank 203 is filled with weakly acidic cation exchange resin 210, and neutralization tank 204 is filled with calcium carbonate 211.

Water softening tank 203 softens raw water containing a hardness component with weakly acidic cation exchange resin 210. The raw water containing a hardness component passes from channel 207 to water softening tank 203, and passes through weakly acidic cation exchange resin 210 filled inside water softening tank 203, thereby passing to neutralization tank 204 via the channel 208 as soft water. The soft water treated with weakly acidic cation exchange resin 210 contains a large amount of hydrogen ions that have been exchanged for the hardness component, and is thus acidified soft water. Here, weakly acidic cation exchange resin 210 is not particularly limited, and ones for general purposes can be used. Examples thereof include a resin having a carboxyl group (—COOH) as an exchange group. A resin in which a hydrogen ion (H+) as a counter ion of a carboxyl group is a cation such as a metal ion or an ammonium ion (NH4+) may also be used.

Neutralization tank 204 neutralizes the pH of the acidified soft water that has passed through water softening tank 203 by the action of calcium carbonate 211, and converts the soft water into neutral water (neutral soft water). In neutralization tank 204, acidic water that has come out of water softening tank 203 by passing through calcium carbonate 211 reacts with carbonate ions gradually released by the calcium carbonate, whereby neutral soft water neutralized by buffering action is allowed to pass to the outside through channel 209. The material filling inside neutralization tank 204 may be any material as long as it can gradually release carbonic acid, and may be sodium carbonate or the like instead of calcium carbonate. Examples of the form of each chemical include a powder form and a tablet form. The calcium carbonate may be, for example, corals or seashells existing in nature.

Channel 207 guides raw water containing a hardness component from inflow port 202 to water softening tank 203. Channel 208 guides raw water softened in water softening tank 203 to neutralization tank 204. Channel 209 guides soft water neutralized in neutralization tank 204 to water take-out port 205.

Regeneration apparatus 206 regenerates weakly acidic cation exchange resin 210 in water softening tank 203. For this purpose, regeneration apparatus 206 includes electrolysis tank 212, treatment tank 213, water pump 214, and circulation channel 215 (see FIG. 6). Regeneration apparatus 206 is connected to channel 207, channel 208, and channel 209, which connect the path from inflow port 202 to water take-out port 205, by first supply channel 216 and recovery channel 217.

Electrolysis tank 212 discharges each of the acidic electrolyzed water and the alkaline electrolyzed water obtained by electrolyzing entering water (water supplied from treatment tank 213) using an electrode (not shown) provided inside. The acidic electrolyzed water is supplied to water softening tank 203 via first supply channel 216, and the alkaline electrolyzed water is supplied to treatment tank 213 via second supply channel 218. That is, regeneration apparatus 206 includes electrolysis tank 212 for generating acidic electrolyzed water for regenerating weakly acidic cation exchange resin 210 and alkaline electrolyzed water.

Treatment tank 213 is a tank or a container provided with air valve 229, and secures and stores water to be circulated in circulation channel 215 when weakly acidic cation exchange resin 210 is regenerated. In addition, in treatment tank 213, the acidic electrolyzed water containing a hardness component that has passed through water softening tank 203 and the alkaline electrolyzed water discharged from electrolysis tank 212 are mixed, and the hardness component is reacted with the alkaline electrolyzed water to be diluted. That is, regeneration apparatus 206 includes treatment tank 213 that causes the hardness component discharged from water softening tank 203 and the alkaline electrolyzed water discharged from electrolysis tank 212 to react with each other at the time of regeneration.

Acidic electrolyzed water containing a hardness component after weakly acidic cation exchange resin 210 in water softening tank 203 is regenerated passes through treatment tank 213 via recovery channel 217. In addition, alkaline electrolyzed water containing anions passes through treatment tank 213 via second supply channel 218.

Then, in treatment tank 213, the acidic electrolyzed water containing a hardness component and the alkaline electrolyzed water containing anions are mixed, and the dilution is performed and the hardness component reacts with the alkaline electrolyzed water. For example, when the hardness component in the acidic electrolyzed water is calcium ions, a reaction in which calcium carbonate is generated or calcium hydroxide is generated occurs by mixing the calcium ions with the alkaline electrolyzed water. Then, the hardness component can be removed, that is, separated, by the reaction.

Note that "the hardness component reacts" includes not only a state in which all the hardness component reacts but also a state in which a component that does not react or a component that does not exceed the solubility product is contained in treatment tank 213.

In treatment tank 213, the treated water obtained by the reaction of the hardness component passes through electrolysis tank 212 and electrolyzed in electrolysis tank 212 to generate acidic electrolyzed water and alkaline electrolyzed water. After the acidic electrolyzed water is reused in water softening tank 203, the alkaline electrolyzed water passes (is recovered) into treatment tank 213 as it is. Therefore, the acidic electrolyzed water used for regenerating weakly acidic cation exchange resin 210, which is conventionally discarded, can be reused in the third exemplary embodiment. In addition, because the water is reused as water from which the hardness component has been removed by the reaction with alkaline electrolyzed water in treatment tank 213, it is possible to suppress a reduction in regeneration efficiency when weakly acidic cation exchange resin 210 is regenerated.

Regeneration apparatus 206 includes filtration part 220 at a front stage of water delivery channel 219 connected from treatment tank 213 to electrolysis tank 212.

The form of filtration part 220 is not limited as long as the reaction product with the hardness component in the treatment water can be separated. Examples thereof include a form of a filtration layer using a granular filter material, a cyclone-type solid-liquid separator, and a hollow fiber membrane.

The granular filter material used for the filtration layer using the granular filter material is intended to capture and remove hardness components, but it is also possible to remove particles having a surface potential to be adsorbed to the granular filter material, particles having a particle size of about 1 μm to 10 μm or chromaticity depending on the existence state of ions and the like in raw water. As the granular filter material, a filter material suitable for an object to be removed, such as filtration sand, a pellet fiber filter material, or the like, can be used. The material of the granular filter material may be, for example, a material having hardness that is likely to settle in water and is less likely to be deformed by pressure, such as sand, anthracite, garnet, ceramics, granular activated carbon, iron oxyhydroxide, or manganese sand. The particle size may be, for example, 0.3 mm to 5.0 mm, and the equivalent coefficient may be 1.2 to 2.0.

Multilayer filtration method in which a plurality of types of filter materials having different specific gravities are mixed and used is a method in which particles having different sizes are layered in order from smallest particles to largest from the bottom as a layer for filtration. In the multilayer filtration method, particles having a large specific gravity and a small size and particles having a small specific gravity and a large size are usually mixed to form a multilayer structure. The multilayer filtration method is preferable because there are advantages such as high filtration efficiency per unit volume and low head loss as compared with a case where a single kind of filter material is used. As a granular filter material, for example, garnet having a particle size of 0.3 mm, sand having a particle size of 0.6 mm, and anthracite having a particle size of 1.0 mm are mixed at 2:1:1 and used, and it is desirable to adjust the mixing ratio and the particle size in accordance with the particle characteristics of the turbid substances.

On the other hand, a cyclone-type solid-liquid separator is an apparatus that classifies and separates water containing a hardness component flowing out of treatment tank 213 into raw water containing small-sized crystals and raw water containing large-sized crystals using centrifugal force instead of gravity.

After the regeneration is finished, circulating water is drained by the action of air valve 229 by opening on-off valve 221.

Although the description overlaps, in water softening system 201, regeneration apparatus 206 is connected to channel 207, channel 208, and channel 209, which connect the path from inflow port 202 to water take-out port 205, by first supply channel 216 and recovery channel 217.

First supply channel 216 is a channel to supply acidic electrolyzed water from electrolysis tank 212 to water softening tank 203. First supply channel 216 is provided with on-off valve 222. That is, in regeneration apparatus 206, first supply channel 216 which can draw out the acidic water from electrolysis tank 212 and supply the acidic water to the upstream side of water softening tank 203 is formed.

Recovery channel 217 is a channel for recovering water containing a hardness component that has passed through water softening tank 203 into treatment tank 213. Recovery channel 217 is provided with on-off valve 223. That is, in regeneration apparatus 206, recovery channel 217 that can connect the downstream side of water softening tank 203 to the upstream side of treatment tank 213 is formed.

Treatment tank 213 and electrolysis tank 212 are connected by water delivery channel 219 and second supply channel 218. Water pump 214 is disposed in water delivery channel 219. That is, in regeneration apparatus 206, water delivery channel 219 that connects the downstream side of treatment tank 213 to the upstream side of electrolysis tank 212 is formed.

Second supply channel 218 supplies alkaline electrolyzed water from electrolysis tank 212 to treatment tank 213. Second supply channel 218 is provided with on-off valve 224. That is, in regeneration apparatus 206, second supply channel 218 that can draw out alkaline electrolyzed water from electrolysis tank 212 and supply the alkaline electrolyzed water to treatment tank 213 is formed.

Figure 6:
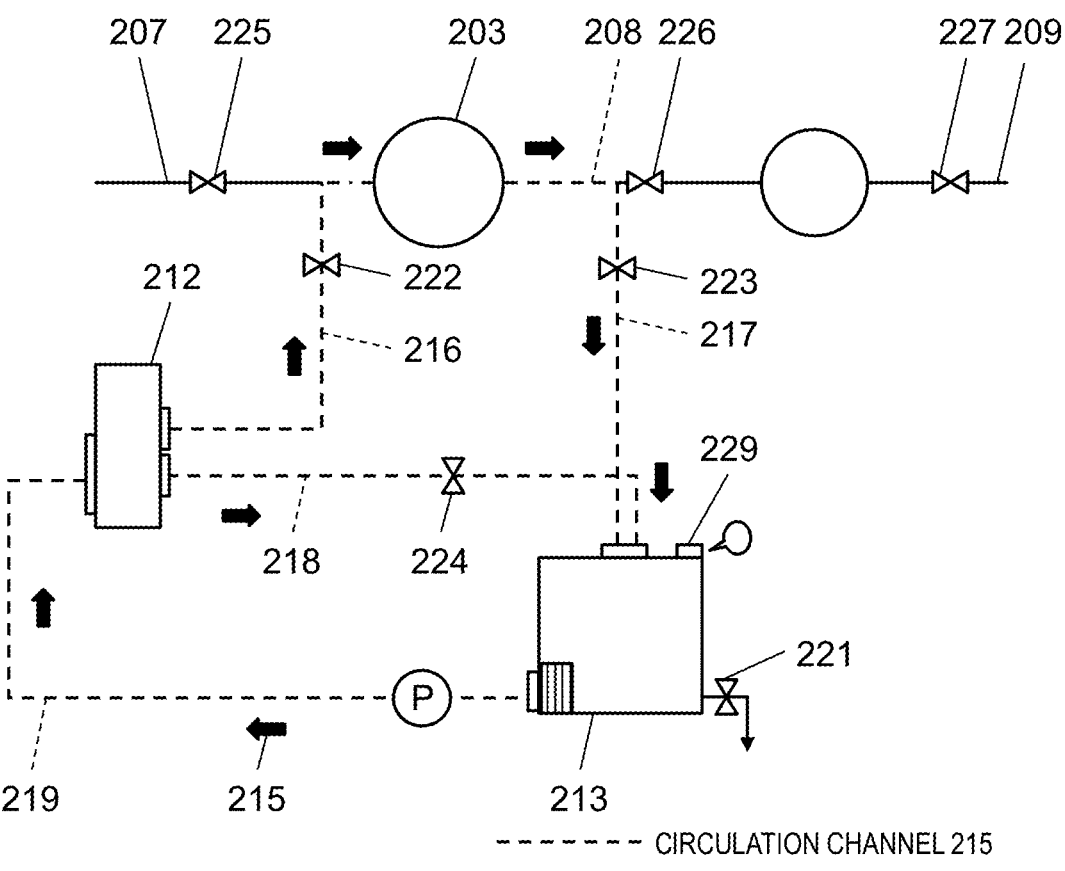
FIG. 6 is a diagram showing a circulation channel of the water softening system.

As a result, as indicated by dotted lines in FIG. 6, it is possible to form circulation channel 215 capable of circulating water from treatment tank 213 to electrolysis tank 212, water softening tank 203, and treatment tank 213. That is, in regeneration apparatus 206, circulation channel 215 for circulating water when weakly acidic cation exchange resin 210 is regenerated is formed.

For this purpose, on-off valve 225 is provided on the downstream side of inflow port 202 in channel 207 for supplying raw water to water softening tank 203. Closing on-off valve 225 and opening on-off valve 222 allows first supply channel 216 to be connected to the upstream side of water softening tank 203. Channel 208 is provided with on-off valve 226. Closing on-off valve 226 and opening on-off valve 223 allows recovery channel 217 to be connected to the upstream side of on-off valve 226 on the downstream side of water softening tank 203 and allows the water (acidic electrolyzed water containing a hardness component) that has passed through water softening tank 203 to be recovered into treatment tank 213. Channel 209 is provided with on-off valve 227. Opening on-off valve 227 allows softened water to be taken out from water take-out port 205.

In addition, opening on-off valve 224 disposed on the downstream side of the alkaline electrolyzed water discharge port of electrolysis tank 212 allows second supply channel 218 to be connected.

As shown in FIG. 5, water pump 214 is preferably disposed at a position on the upstream side of electrolysis tank 212 and on the downstream side of treatment tank 213.

It is desirable that on-off valve 221, on-off valve 222, on-off valve 223, on-off valve 224, on-off valve 225, on-off valve 226, on-off valve 227, and water pump 214 are switched by the control unit (not shown) as shown in FIG. 7. The control unit includes, for example, a computer system including a processor and a memory. With the processor executing a program stored in the memory, the computer system functions as the control unit. Here, the program executed by the processor is assumed to be recorded in advance in the memory of the computer system. The program may be provided by being recorded in a non-temporary recording medium such as a memory card, or may be provided through a telecommunication line such as the Internet.

In the above configuration, water softening system 201 shown in FIG. 5 performs four operation patterns by switching each on-off valve according to a signal from the control unit. Here, the operation patterns and the movement of each on-off valve will be described with reference to FIGS. 6 and 7.

FIG. 6 is a diagram showing circulation channel 215 of water softening system 201. FIG. 7 is a diagram showing an operation pattern of water softening system 201. As shown in FIG. 7, the operation patterns are divided in the time of water softening, the time of water injection, the time of regeneration, and the time of draining. In FIG. 7, the movement of each on-off valve is "ON" for opening and "OFF" for closing. For the electrode of the electrolysis tank 212 and water pump 214, the operating state is referred to as "ON", and the stopped state is referred to as "OFF".

First, an operation in the water softening treatment by water softening system 201 will be described.

As shown at the time of water softening in FIG. 7, by opening on-off valve 225 provided in water take-out port 205 in a state where on-off valve 226 is open, raw water containing a hardness component passes through water softening tank 203 and neutralization tank 204, and therefore softened water can be taken out from water take-out port 205. At this time, on-off valve 221, on-off valve 222, on-off valve 223, and on-off valve 224, which are the other on-off valves, are all in a closed state, and the electrode of the electrolysis tank 212 and water pump 214 are stopped.

In the case of softening raw water containing a hardness component, the raw water is supplied from inflow port 202 to water softening tank 203 through channel 207 by the pressure of city water. Then, the raw water passes through weakly acidic cation exchange resin 210 provided in water softening tank 203. At this time, cations as the hardness component in the raw water are adsorbed by the action of weakly acidic cation exchange resin 210, and hydrogen ions are released (ion exchange is performed). Cations are removed, whereby the raw water is softened. The softened water further passes through channel 208 and proceeds to neutralization tank 204. In neutralization tank 204, carbonate ions are gradually released by the action of calcium carbonate 211, and protons are buffered and neutralized. That is, neutral water softened as domestic water can be taken out from water take-out port 205.

Next, an operation of water softening system 201 in the regeneration treatment by regeneration apparatus 206 will be described.

In water softening system 201, water softening tank 203 is regenerated by regeneration apparatus 206 at predetermined time intervals by the operation of the control unit.

As shown at the time of water injection in FIG. 7, opening on-off valve 223 and on-off valve 225 at the initial stage of regeneration by regeneration apparatus 206 allows raw water to be introduced into treatment tank 213 from inflow port 202 through water softening tank 203 by the pressure of city water. At this time, on-off valve 221, on-off valve 222, on-off valve 224, and on-off valve 226, which are the other on-off valves, are closed, and the electrode of electrolysis tank 212 and water pump 214 are stopped. In addition, air can constantly enter and exit from air valve 229. Regeneration apparatus 206 can store a predetermined amount of water in treatment tank 213 to secure the amount of water at the time of regeneration. In addition, because the injected regenerating water passes through water softening tank 203 and is stored in treatment tank 213, its hardness is reduced, and the regeneration can be more efficiently performed as compared with the case of circulating hard water.

Subsequently, as shown at the time of regeneration in FIG. 7, on-off valve 222, on-off valve 223, and on-off valve 224 are opened, and at this time, on-off valve 221, on-off valve 225, and on-off valve 226 are closed, and water pump 214 and electrodes of the electrolysis tank 212 are operated. Then, the water stored in treatment tank 213 circulates in circulation channel 215, and circulation channel 215 shown in FIG. 6 is formed.

As shown in FIG. 6, the acidic electrolyzed water generated in electrolysis tank 212 passes through first supply channel 216, is supplied into water softening tank 203, and passes through weakly acidic cation exchange resin 210 inside water softening tank 203. That is, by passing through weakly acidic cation exchange resin 210, cations (hardness components) adsorbed to weakly acidic cation exchange resin 210 undergo an ion exchange reaction with hydrogen ions contained in the acidic electrolyzed water. As a result, weakly acidic cation exchange resin 210 is regenerated. The acidic electrolyzed water that has passed through weakly acidic cation exchange resin 210 contains cations and flows into recovery channel 217. That is, the acidic electrolyzed water containing cations that has passed through weakly acidic cation exchange resin 210 is recovered into treatment tank 213 via recovery channel 217.

The alkaline electrolyzed water generated in electrolysis tank 212 is supplied into treatment tank 213 through second supply channel 218.

In treatment tank 213, acidic electrolyzed water containing cations recovered from water softening tank 203 and alkaline electrolyzed water containing anions supplied from electrolysis tank 212 are mixed. At this time, in treatment tank 213, the hardness component which is cations in the acidic electrolyzed water reacts with the alkaline electrolyzed water. For example, when the hardness component in the acidic electrolyzed water is calcium ions, calcium hydroxide is generated by the alkaline electrolyzed water, or calcium carbonate is generated from bond between calcium ions and carbonate ions existing in water.

Then, the water (treated water) in treatment tank 213 after the reaction passes through electrolysis tank 212.

That is, the water in treatment tank 213 passes through electrolysis tank 212 again to generate acidic electrolyzed water, and the acidic electrolyzed water is used for regeneration of weakly acidic cation exchange resin 210. Therefore, in the acidic electrolyzed water used for regenerating weakly acidic cation exchange resin 210, the hardness component is changed to be a dilution or a reaction product in treatment tank 213, and the reaction product is filtered by filtration part 220 so that the water is reused as electrolyzed water again. In addition, the electrolyzed water to be reused is treated by treatment tank 213, and therefore the hardness component is reduced as compared with the case where treatment tank 213 is not provided. Further, when electrolysis is performed in electrolysis tank 212, the hardness component which is cations is electrolyzed into the alkaline electrolyzed water, and therefore the hardness of the acidic electrolyzed water decreases, and a decrease in regeneration efficiency can be suppressed. As a result, water softening system 201 according to the third exemplary embodiment can reuse the acidic electrolyzed water while suppressing a decrease in regeneration efficiency in regenerating weakly acidic cation exchange resin 210. Furthermore, it is possible to suppress adhesion of sticking objects originating from the hardness component in water softening tank 203.

As shown at the time of draining in FIG. 7, after the regeneration is finished, the electrode of electrolysis tank 212 are stopped, on-off valve 221, on-off valve 222, on-off valve 223, and on-off valve 224 are opened, and on-off valve 225 and on-off valve 226 are closed. Then, the water in circulation channel 215 is drained from on-off valve 221 by water pump 214. As a result, residual water disappears from circulation channel 215, and the inside of the pipes is less likely to be contaminated.

Water softening system 201 according to the third exemplary embodiment of the present disclosure can be applied to a point-of-use (POU) water purification system or a point-of-entry (POE) water purification system.

Fourth Exemplary Embodiment

Fourth exemplary embodiment of the present disclosure relates to a water softening system for removing a hardness component contained in tap water or the like.

Conventionally, for the purpose of softening tap water, a technique of exchanging calcium with sodium using an ion exchange resin is mainly known. Ion exchange resins are used for softening water by exchanging calcium ions or magnesium ions contained in tap water with sodium. Water softening systems using ion exchange resins have been widely used because of their simple configuration (see PTL 3).

However, the water softening method using such an ion exchange resin has a problem that the ion exchange resin needs to be periodically regenerated with high-concentration salt water, and the drainage water thereof causes environmental problems.

As a water softening method not involving a regeneration treatment of an ion exchange resin, a method including crystallizing calcium carbonate by increasing the pH of water by an alkali method, thereafter mixing a flocculant to form flocs, and then removing the flocs in the subsequent stage is known (see PTL 4).

The alkali method used in this conventional water softening method not involving a regeneration treatment of an ion exchange resin has a problem that it takes time to deposit calcium carbonate, and thus it takes time for water softening treatment.

Therefore, an object of the present disclosure is to provide a water softening system that realizes a short treatment time by quickly precipitating calcium carbonate.

A water softening system according to the present disclosure includes a first reaction tank, a second reaction tank, and a filtration tank that are connected to each other in this order and have equal treatment capacities, the water softening system softening water by treating and transferring water to be treated in units of the treatment capacities, wherein the first reaction tank is a reaction tank for a mixing treatment of water to be treated with a pH adjusting agent, the second reaction tank is a reaction tank for a mixing treatment with a flocculant, the filtration tank is a filtration tank for filtering particles having a predetermined particle size, and the first reaction tank is provided with an ultrasonic vibrator.

For example, in a case where the water to be treated is tap water containing calcium ions, the pH adjusting agent is sodium carbonate, and the flocculant is chitosan, the water softening system according to the present disclosure can soften the water in a short time by quickly depositing calcium carbonate.

The water softening system according to the present disclosure includes a first reaction tank, a second reaction tank, and a filtration tank that are connected to each other in this order and have equal treatment capacities, the water softening system softening water by treating and transferring water to be treated in units of the treatment capacities, wherein the first reaction tank is a reaction tank for a mixing treatment of water to be treated with a pH adjusting agent, the second reaction tank is a reaction tank for a mixing treatment with a flocculant, the filtration tank is a filtration tank for filtering particles having a predetermined particle size, and the first reaction tank is provided with an ultrasonic vibrator.

As a result, for example when the water to be treated is tap water containing calcium ions, the pH adjusting agent is sodium carbonate, and the flocculant is chitosan, the water softening system according to the present disclosure deposits calcium ions in tap water as a solid of calcium carbonate in the first reaction tank, coarsens calcium carbonate particles in the second reaction tank, and performs solid-liquid separation in the filtration tank. This allows the water softening system according to the present disclosure to reduce the calcium ion concentration in a short treatment time. In particular, the water softening system according to the present disclosure can promote deposition of calcium carbonate and perform water softening in a short time by including the ultrasonic vibrator in the first reaction tank.

In addition, the water softening system according to the present disclosure mixes sodium carbonate as a pH adjusting agent in the first reaction tank so that a concentration of the sodium carbonate becomes 100 ppm to 1000 ppm.

Accordingly, in the water softening system according to the present disclosure, carbonate ions of sodium carbonate and calcium ions react with each other to produce calcium carbonate. To deposit calcium carbonate, it is preferable to adjust the pH of water to 8 to 10, and the pH can be adjusted by mixing 100 ppm to 1000 ppm of sodium carbonate.

In addition, the water softening system according to the present disclosure applies ultrasonic vibration to the water to be treated after the mixing treatment with the pH adjusting agent by the ultrasonic vibrator in the first reaction tank.

This allows the water softening system according to the present disclosure to promote the reaction between sodium carbonate and calcium ions and to further improve the deposition rate.

In addition, the water softening system according to the present disclosure mixes chitosan as a flocculant in the second reaction tank so that a concentration of the chitosan becomes 5 ppm to 150 ppm.

As a result, in the water softening system according to the present disclosure, the deposited calcium carbonate flocculates to have a size with which the calcium carbonate can be easily separated in the filtration tank in the next step.

In addition, the water softening system according to the present disclosure includes sand filling the filtration tank with which particles of more than or equal to 10 $\mu$m can be removed.

This allows the water softening system according to the present disclosure to remove the calcium carbonate coarsened in the second reaction tank by sand filtration. In addition, the water softening system according to the present disclosure can easily regenerate the filtration tank by backwashing.

Hereinafter, a fourth exemplary embodiment of the present disclosure will be described with reference to FIG. 8.

Figure 8:
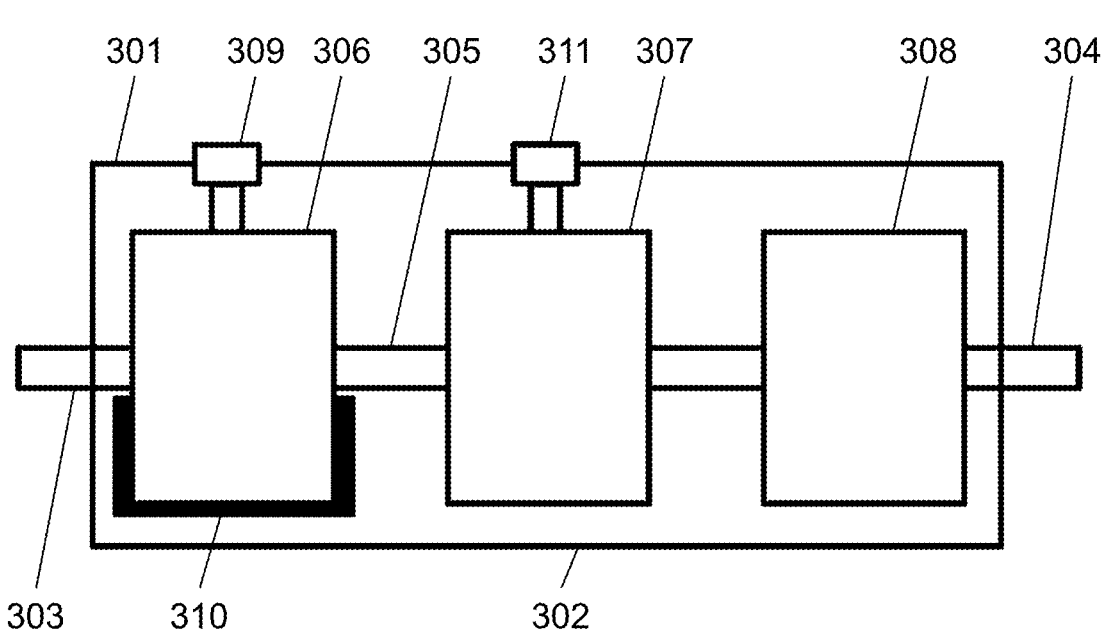
FIG. 8 is a conceptual diagram showing a configuration of a water softening system according to a fourth exemplary embodiment of the present disclosure.

FIG. 8 is a conceptual diagram showing a configuration of water softening system 301 according to the fourth exemplary embodiment.

As shown in FIG. 8, main body 302 of water softening system 301 is provided with inlet 303 to receive water supplied from the outside and outlet 304 to allow treated water to flow out. Water softening system 301 includes pipe 305 connecting the path from inlet 303 to outlet 304 in main body 302, and connects first reaction tank 306, second reaction tank 307, and filtration tank 308 in the path in this order in which treatment capacities are equal to each other.

First reaction tank 306 is a reaction tank for mixing the water to be treated from inlet 303 with a pH adjusting agent.

First reaction tank 306 is provided with pH adjusting agent supply part 309 and ultrasonic vibrator 310. The pH adjusting agent preferably causes the water to be treated after the mixing treatment with the pH adjusting agent in first reaction tank 306 to have a pH of about 8 to 10. When sodium carbonate is used as the pH adjusting agent, it is preferable to mix 100 ppm to 1000 ppm of sodium carbonate. The water having a pH of more than or equal to 8 allows bicarbonate ions in the water to be biased to carbonate ions and allows calcium carbonate to be easily generated. Other examples of the pH adjusting agent that may be used include sodium hydroxide, potassium hydroxide, and an alkaline buffer solution. Water softening system 301 according to the fourth exemplary embodiment uses sodium carbonate as the pH adjusting agent. The operation of ultrasonic vibrator 310 starts after or simultaneously with the mixing of the pH adjusting agent, and vibration is applied to the water to be treated after the mixing treatment with the pH adjusting agent, whereby the generation of calcium carbonate is promoted, and the water to be treated after the mixing treatment with the pH adjusting agent becomes cloudy.

Second reaction tank 307 is a reaction tank for mixing and treating the flocculant. Second reaction tank 307 is provided with flocculant supply part 311. Mixing the flocculant with the calcium carbonate deposited in first reaction tank 306 allows the calcium carbonate to be coarsened. For this purpose, when chitosan is used as the flocculant, it is preferable to mix 5 ppm to 150 ppm of chitosan, and in this case, the calcium carbonate after mixing has a particle size of no less than or equal to 10 $\mu$m. As the flocculant, there are inorganic flocculants and organic flocculants, and the coarsening can also be performed by using them in combination.

Filtration tank 308 is a filtration tank for filtering particles having a predetermined particle size.

Filtration tank 308 is filled with a sand filter material. Water from which calcium components have been removed can be obtained by allowing the water to be treated containing the calcium carbonate coarsened in second reaction tank 307 to pass through sand filtration. In addition, backwashing can be performed by reversely passing water, and the filtered particles can be removed. As the filter material, it is preferable to use sand capable of filtering particles having a particle size of no less than or equal to 10 $\mu$m. When the particle size is no less than or equal to 10 $\mu$m, the particles are less likely to float during backwashing, and when the particle size is no more than or equal to 10 $\mu$m, the pressure loss during filtration increases, which is not preferable.

With the above configuration, first, when water to be treated is caused to flow into first reaction tank 306 from inlet 303, sodium carbonate is supplied as the pH adjusting agent from pH adjusting agent supply part 309. The inflow amount of the water to be treated and the supply amount of sodium carbonate are determined from the treatment capacity in first reaction tank 306. A predetermined amount of sodium carbonate is supplied so that the concentration of sodium carbonate in first reaction tank 306 becomes 100 ppm to 1000 ppm in accordance with the inflow amount of the water to be treated. When the supply of sodium carbonate is finished, ultrasonic vibrator 310 starts its operation to vibrate the water to be treated after the mixing treatment of sodium carbonate to promote the generation of calcium carbonate. As a result, the water to be treated after the mixing treatment of sodium carbonate becomes cloudy.

The water to be treated subjected to the mixing treatment of the pH adjusting agent in first reaction tank 306 as described above is then transferred to second reaction tank 307 through pipe 305. When the water to be treated is transferred to second reaction tank 307, new water to be treated flows into first reaction tank 306. In this manner, the water to be treated is supplied and the treatment is performed in units of treatment capacity of the tank.

In second reaction tank 307, flocculant supply part 311 supplies chitosan as a flocculant. A predetermined amount of chitosan is supplied so that the concentration of chitosan in second reaction tank 307 is 5 ppm to 150 ppm with respect to the treatment capacity in second reaction tank 307. By mixing the flocculant with the water to be treated (calcium carbonate suspension) which has gone through the mixing treatment with calcium carbonate and transferred from first reaction tank 306, calcium carbonate can be coarsened. Calcium carbonate has a particle size of no less than or equal to 10 μm by being mixed with chitosan.

The water to be treated containing the calcium carbonate coarsened in second reaction tank 307 is then transferred to filtration tank 308 through pipe 305. In filtration tank 308, the calcium carbonate having a particle size of no less than or equal to 10 μm is filtered and removed by sand as the filter material. In this manner, the calcium component is removed in filtration tank 308 from the water to be treated containing the coarsened calcium carbonate transferred from second reaction tank 307, and the water can be softened.

When vibration is applied to the water to be treated mixed with the pH adjusting agent using ultrasonic vibrator 310 in the process of softening water and the process of pH adjustment as described above, the generation of calcium carbonate can be promoted. That is, water softening system 301 can quickly deposit calcium carbonate and therefore can shorten the treatment time.

Water softening system 301 according to the fourth exemplary embodiment of the present disclosure is useful for suppressing scale damage in a hard water region.

Fifth Exemplary Embodiment

The present disclosure relates to a water softening system for removing hardness components contained in tap water or the like.

Conventionally, a method has been known in which a water softening system using an ion exchange resin is connected to a tap to adsorb calcium ions and magnesium ions contained in hard water. When the adsorption power of the ion exchange resin is lost, adsorbed calcium ions and magnesium ions are replaced with sodium ions through salt water to regenerate and activate the adsorption capability (see, for example PTL 5).

In such a conventional water softening system, it is necessary to periodically send salt water having a high concentration to the water softening system in order to regenerate the ion exchange resin, and there is a problem that it takes time and effort for maintenance. Therefore, an object of the present disclosure is to provide a water softening system capable of removing calcium ions and magnesium ions, which are hardness components in water, over a relatively long period of time.

A water softening system according to the present disclosure includes a first treatment part, a second treatment part, and a third treatment part, wherein the first treatment part is provided with an alkali supplying body that supplies hydroxide ions to raw water containing calcium ions and magnesium ions and changes the calcium ions contained in the raw water into calcium carbonate crystals, the second treatment part is provided with a filter body that physically removes calcium carbonate crystallized in the first treatment part, the third treatment part is provided with a magnesium ion remover that removes magnesium ions in the raw water, and each treatment is performed in order of the first treatment part, the second treatment part, and the third treatment part.

The water softening system according to the present disclosure can remove calcium ions and magnesium ions, which are hardness components in water, over a relatively long period of time.

The water softening system according to the present disclosure includes a first treatment part, a second treatment part, and a third treatment part, wherein the first treatment part is provided with an alkali supplying body that supplies hydroxide ions to raw water containing calcium ions and magnesium ions and changes the calcium ions contained in the raw water into calcium carbonate crystals, the second treatment part is provided with a filter body that physically removes calcium carbonate crystallized in the first treatment part, the third treatment part is provided with a magnesium ion remover that removes magnesium ions in the raw water, and each treatment is performed in order of the first treatment part, the second treatment part, and the third treatment part.

The water softening system according to the present disclosure first crystallizes calcium ions into calcium carbonate and physically removes them, and then removes magnesium ions. This allows the water softening system according to the present disclosure to suppress consumption of the magnesium ion remover and to use the magnesium ion remover for a relatively long period of time.

In addition, the alkali supplying body in the water softening system according to the present disclosure adjusts the pH of water to a pH at which calcium ions in the water are crystallized but magnesium ions are hardly crystallized.

The water softening system according to the present disclosure selectively crystallizes calcium ions in water on the upstream side of the third treatment part and removes the calcium ions by the filter body. In the water softening system according to the present disclosure, the third treatment part mainly removes magnesium ions only, and therefore the consumption of the magnesium ion remover can decrease, and the magnesium ion remover can be used for a relatively long period of time.

Hereinafter, a fifth exemplary embodiment of the present disclosure will be described with reference to the drawings.

Figure 9:
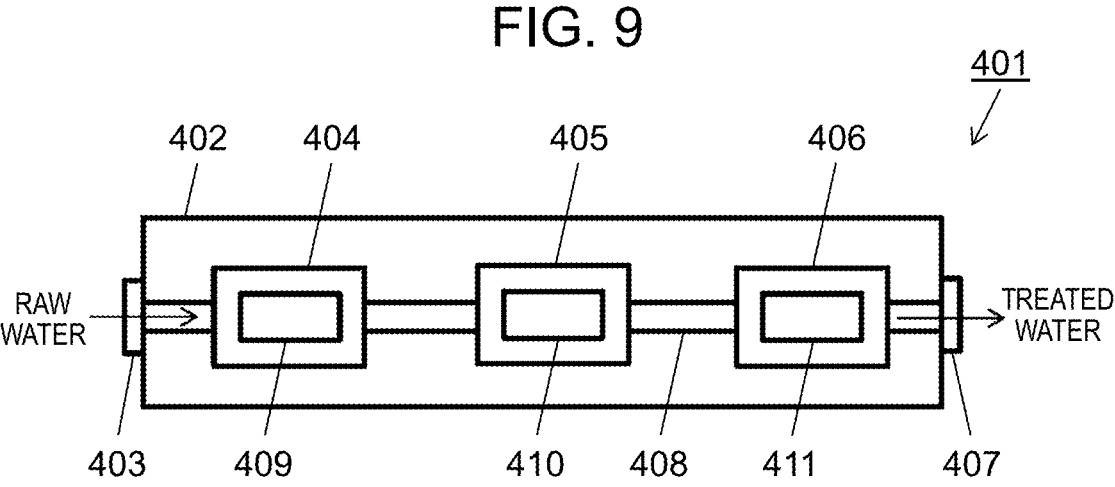
FIG. 9 is a schematic view showing a configuration of a water softening system according to a fifth exemplary embodiment of the present disclosure.

FIG. 9 is a schematic view showing a configuration of water softening system 401 according to the fifth exemplary embodiment.

As shown in FIG. 9, main body 402 of water softening system 401 is provided with hard water supply port 403, first treatment part 404, second treatment part 405, third treatment part 406, soft water outflow port 407, and pipe 408 connecting them.

Hard water supply port 403 is connected to a water pipe, and is supplied with hard water which is raw water containing calcium ions and magnesium ions (hereinafter, also simply referred to as "hard water").

First treatment part 404 is provided with alkali supplying body 409 for making hard water that has flowed in from hard water supply port 403 alkaline and changing calcium ions into calcium carbonate crystals. That is, first treatment part 404 is provided with alkali supplying body 409 that supplies hydroxide ions to raw water containing calcium ions and magnesium ions to change the calcium ions contained in the raw water into calcium carbonate crystals.

Alkali supplying body 409 can adjust water to have a pH at which calcium ions in the water are crystallized but magnesium ions are hardly crystallized, and may be in any form of gas, liquid, or solid. In the case of an alkaline agent, sodium carbonate, sodium hydroxide, potassium hydroxide, or the like may be added, or hydroxide ions may be added by electrolysis of water. It may also be a metal or a metal oxide which reacts with water to supply hydroxide ions into water. Specifically, any metal that reacts with water may be used, for example Li, K, Ca, Na, Mg, Al, Zn, Fe, and the like can be considered. Li, K, Ca, Na react vigorously with water to alkalize water. Al, Zn, Fe react with high-temperature water to alkalize water. Because Mg reacts with water at room temperature, alkalization using Mg water is considered to be practically optimal.

The reaction formula between the magnesium solid and water is shown below.

$$Mg+2H_2O \rightarrow Mg^{2+}+2OH^-+H2\uparrow$$

The reaction between magnesium oxide and water is shown below.

$$MgO+H_2O \rightarrow Mg^{2+}+2OH^-$$

This reaction can be used without generating hydrogen. In addition, a metal compound including a metal in the above-described metals may be used.

Second treatment part 405 is provided with filter body 410 for filtering water containing calcium carbonate that flowed in from first treatment part 404. That is, second treatment part 405 is provided with filter body 410 which physically removes the calcium carbonate crystallized in first treatment part 404.

Filter body 410 only needs to be able to remove the crystallized calcium carbonate. The particle size of the crystallized calcium carbonate is measured by a laser diffraction/scattering particle size distribution measuring apparatus, and is about 0.1 μm to 30 μm in terms of a median size. The filter body is not limited to this as long as it is a filter material commonly used in water purification applications by filtration, such as a filter, a membrane, sand, or fiber, to remove these particles. One example of a measuring instrument using the above-described laser diffraction/scattering type particle size distribution measuring apparatus is LA-960 manufactured by HORIBA, Ltd.

Third treatment part 406 is provided with magnesium ion remover 411 that removes magnesium ions of water containing magnesium ions that has flowed in from second treatment part 405. That is, third treatment part 406 is provided with magnesium ion remover 411 that removes magnesium ions in raw water.

Magnesium ion remover 411 only needs to remove magnesium ions from water. In particular, when the magnesium ion remover is a resin, it is preferable that the resin be an addition polymer of an unsaturated compound having a carboxyl group, whose particle size containing 1 wt % to 20 wt % of calcium is 0.1 mm to 5 mm. In addition, the material is not limited to this as long as it is a commonly used calcium/magnesium exchanger, an adsorbent, or a sorbent, such as zeolite, a strongly acidic ion exchange resin, or a weakly acidic ion exchange resin.

Soft water outflow port 407 is connected to pipe 408, and the soft water flowed out from soft water outflow port 407 is distributed to a bathroom, a kitchen, and the like.

In the above configuration, the water that has passed through first treatment part 404 is modified into water containing calcium carbonate solid and magnesium ions, and flows into second treatment part 405. At this time, second treatment part 405 removes the calcium carbonate from the water. The water that has passed through second treatment part 405 is reformed into water containing magnesium ions and flows into third treatment part 406.

Third treatment part 406 removes magnesium ions from the water by magnesium ion remover 411. The water that has passed through third treatment part 406 becomes soft water, flows out to soft water outflow port 407, and can be used in a bathroom or a kitchen.

As described above, water softening system 401 according to the fifth exemplary embodiment can selectively crystallize calcium ions in water on the upstream side of third treatment part 406 provided with magnesium ion remover 411 and remove the crystallized calcium carbonate by filter 410. In this manner, in water softening system 401 according to the fifth exemplary embodiment, calcium ions are firstly crystallized into calcium carbonate and physically removed by first treatment part 404 and second treatment part 405, and then magnesium ions are removed from water by third treatment part 406. Therefore, water softening system 401 according to the fifth exemplary embodiment can reduce consumption of magnesium ion remover 411, and can use magnesium ion remover 411 for a relatively long period of time.

Example 1

First, an example of crystallizing calcium ions will be described.

A reaction in a configuration in which a magnesium solid is provided in first treatment part 404 as one example of alkali supplying body 409 will be described.

First treatment part 404 is provided with a magnesium solid of about 6 mm, and the raw water that flowed in from hard water supply port 403 comes into contact with the magnesium. The reaction formula between the magnesium solid and water is shown below.

$$Mg+2H_2O \rightarrow Mg^{2+}+2OH^-+H2\uparrow \qquad (1)$$

$$HCO^{3-}+OH^- \rightarrow CO_3^{2-}+H_2O \qquad (2)$$

$$Ca^{2+}+CO_3^{2-} \rightarrow CaCO_3\downarrow \qquad (3)$$

The magnesium solid reacts with water to generate hydroxide ions ($OH^-$). Hydroxide ions ($OH^-$) and bicarbonate ions ($HCO^{3-}$) react to be carbonate ions ($CO_3^{2-}$). Calcium ions ($Ca^{2+}$) react with carbonate ions ($CO_3^{2-}$) to change into calcium carbonate crystals.

Figure 10:
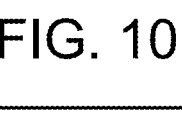
FIG. 10 includes graphs showing changes in an amount of calcium ions and a pH in a water softening system according to Example 1 of the fifth exemplary embodiment ((a) a graph showing a transition of calcium ions, (b) a graph showing a change in pH).

FIG. 10(*a*) is a graph showing the transition of calcium ions due to this reaction. FIG. 10(*b*) shows the results of the change in pH. FIGS. 10(*a*) and 10(*b*) show results when 2 g of the magnesium solid was added to 100 mL of tap simulated water having a hardness of 310 ppm and stirred. The aqueous solution obtained at each time after 2 g of the magnesium solid was added was collected, crystals were removed with a 0.2 μm filter, and the ion amount was measured. According to this, the pH increases with time, and calcium ions decrease as the pH increases. It is found that the amount of calcium ions is almost constant until the pH reaches about 8.5, but decreases when the pH reaches 8.5. This suggests that it is associated with an increase in calcium carbonate crystals. As shown in FIGS. 10(*a*) and 10(*b*), the pH gradually increased to reach pH 10 after 20 minutes, and about 75% of calcium ions were crystallized. At this time, crystals of magnesium ions could not be detected. From the above, alkali supplying body 409 according to Example 1 needs to adjust the pH to about pH 8 to pH 11 as a pH at which calcium ions in the water are crystallized but magnesium ions are hardly crystallized.

The ion amount was measured by ion chromatography. One example of a measuring instrument is ICS-2100 manufactured by Dionex Corporation.

As described above, alkali supplying body 409 according to Example 1 can selectively crystallize calcium ions with respect to magnesium ions. When water is alkalized with an alkaline agent, there is a problem that a large amount of chemical agent is required, or counterions increase, and therefore the water is not suitable as domestic water. On the other hand, water softening system 401 according to Example 1 only increases magnesium ions in water by alkalization using the magnesium solid, and the water can be used as domestic water without any problem.

Example 2

Next, water softening system 401 according to Example 2 of the fifth exemplary embodiment will be described.

Figure 11:
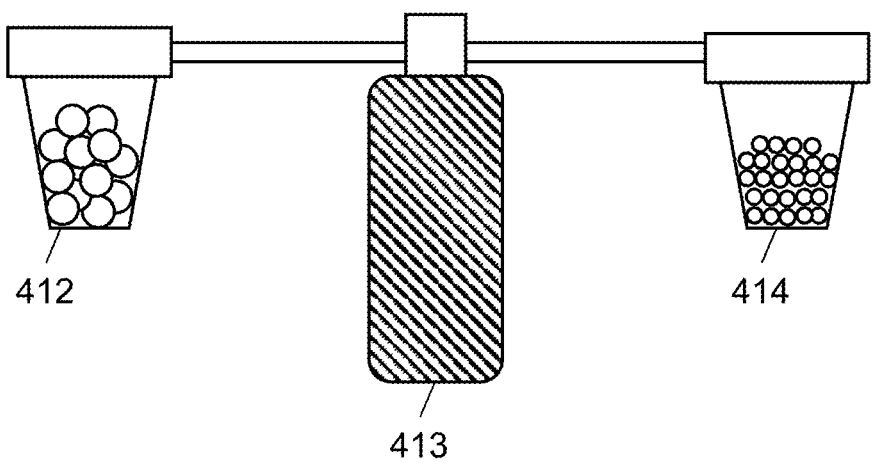
FIG. 11 is a schematic view showing a configuration of a water softening system according to Example 2 of the fifth exemplary embodiment.

FIG. 11 is a schematic view showing a configuration of water softening system 401 according to Example 2 of the fifth exemplary embodiment.

As shown in FIG. 11, first treatment part 404 is provided with magnesium solid 412, and second treatment part 405 is provided with filter 413. In addition, third treatment part 406 is provided with resin 414 which is an addition polymer of an unsaturated compound having a carboxyl group, whose particle size containing 1 wt % to 20 wt % of calcium is in a range of from 0.1 mm to 5 mm. That is, Example 2 shows a configuration in which magnesium solid 412 is provided as one example of alkali supplying body 409, filter 413 is provided as one example of filter body 410, and resin 414 is provided as one example of magnesium ion remover 411.

Figure 12:
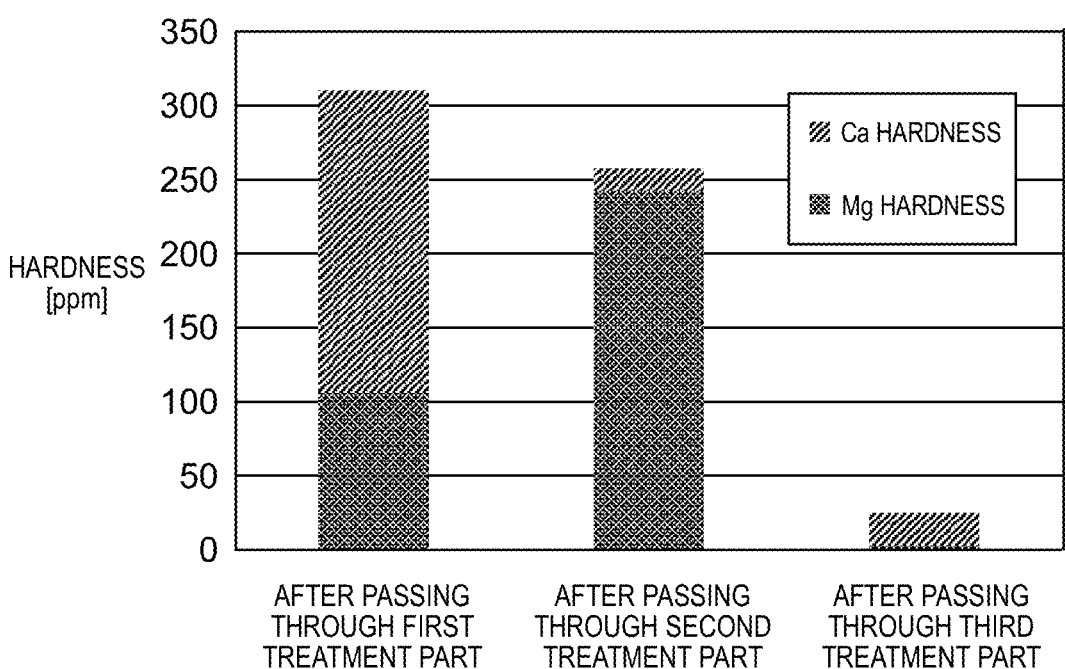
FIG. 12 is a graph showing changes in hardness in each treatment step of the water softening system.

FIG. 12 shows results of a principle confirmation test of first treatment part 404, second treatment part 405, and third treatment part 406. In the procedure of the principle confirmation test, 100 mL of tap simulated water having a hardness of 310 ppm was prepared as raw water, and as first treatment part 404, a magnesium solid was added to the tap simulated water so as to be 1 g and stirred for 60 minutes. Next, as second treatment part 405, the water was filtered through a 0.2 μm filter. Thereafter, as third treatment part 406, 0.5 mL of a resin which is an addition polymer of an unsaturated compound having a carboxyl group is added to the filtered water from second treatment part 405 and stirred for 60 minutes.

The raw water after the treatment with first treatment part 404 contains 204 ppm of calcium and 106 ppm of magnesium ions in 310 ppm of hard water. When the raw water has passed through second treatment part 405, the amount of calcium decreases to 14 ppm, while the amount of magnesium ions is 244 ppm, and the total hardness is 258 ppm. When the raw water has passed through third treatment part 406, the amount of calcium ions was 22 ppm and the amount of magnesium ions was 3 ppm, and the total hardness was able to be reduced to 25 ppm. The increase in calcium ions through the steps with second treatment part 405 and third treatment part 406 is a measurement error.

As a result, the life of magnesium ion remover 411 was able to be extended about 1.2 times. The same ion chromatography as in Example 1 was used for the measurement.

That is, water softening system 401 according to Example 2 of the fifth exemplary embodiment can extend the life of magnesium ion remover 411 and soften hard water by passing water through first treatment part 404, second treatment part 405, and third treatment part 406 in this order.

Water softening system 401 according to the fifth exemplary embodiment is useful for suppressing scale damage in a hard water region.

Sixth Exemplary Embodiment

The present disclosure relates to a water softening system for removing hardness components contained in tap water or the like.

Conventionally, a method has been known in which a water softening system using an ion exchange resin is connected to a tap to adsorb calcium ions and magnesium ions contained in hard water. When the adsorption power of the ion exchange resin is lost, adsorbed calcium ions and magnesium ions are replaced with sodium ions through salt water to regenerate and activate the adsorption capability (see, for example PTL 5).

In such a conventional water softening system, it is necessary to periodically send salt water having a high concentration to the water softening system in order to regenerate the ion exchange resin, and there is a problem that it takes time and effort for maintenance.

Therefore, an object of the present disclosure is to provide a water softening system capable of removing calcium ions and magnesium ions, which are hardness components in water, over a relatively long period of time.

A water softening system according to the present disclosure includes a first treatment part, a second treatment part, and a third treatment part, wherein the first treatment part is provided with a granular alkali supplying body that supplies hydroxide ions to raw water containing calcium ions and magnesium ions and changes the calcium ions contained in the raw water into calcium carbonate crystals, the second treatment part is provided with a filter body that physically removes calcium carbonate crystallized in the first treatment part, the third treatment part is provided with a magnesium ion remover that removes magnesium ions in the raw water, each treatment is performed in order of the first treatment part, the second treatment part, and the third treatment part, and the first treatment part is provided with an ultrasonic wave generator.

The water softening system according to the present disclosure can remove calcium ions and magnesium ions, which are hardness components in water, over a long period of time.

The water softening system according to the present disclosure includes a first treatment part, a second treatment part, and a third treatment part, wherein the first treatment part is provided with a granular alkali supplying body that supplies hydroxide ions to raw water containing calcium ions and magnesium ions and changes the calcium ions contained in the raw water into calcium carbonate crystals, the second treatment part is provided with a filter body that physically removes calcium carbonate crystallized in the first treatment part, the third treatment part is provided with a magnesium ion remover that removes magnesium ions in the raw water, each treatment is performed in order of the first treatment part, the second treatment part, and the third treatment part, and the first treatment part is provided with an ultrasonic wave generator.

The water softening system according to the present disclosure first crystallizes calcium ions into calcium carbonate and physically removes them, and then removes magnesium ions. As a result, consumption of the magnesium ion remover by calcium ions can be suppressed, and the magnesium ion remover can be used for a relatively long period of time. Therefore, the water softening system according to the present disclosure can supply soft water without requiring maintenance such as frequent regeneration with salt water as in the conventional water softening system.

In addition, the water softening system according to the present disclosure can finely vibrate the granular alkali supplying body by the ultrasonic vibration generated from the ultrasonic wave generator provided in the first treatment part to promote pH adjustment. In addition, the water softening system according to the present disclosure can suppress sediments on alkali supplying bodies by rubbing the alkali supplying bodies with each other with the energy of ultrasonic vibration, and can supply hydroxide ions for a relatively long period of time. In addition, the water softening system according to the present disclosure can increase the water temperature by vibration of water molecules by ultrasonic waves, and can stably supply hydroxide ions even when the water temperature is low in winter or cold climates.

In addition, the alkali supplying body in the water softening system according to the present disclosure adjusts the pH of water to a pH at which calcium ions in the water are crystallized but magnesium ions are hardly crystallized.

As a result, the water softening system according to the present disclosure selectively crystallizes calcium ions in water on the upstream side of the third treatment part and removes the calcium ions by the filter body. In the water softening system according to the present disclosure, the third treatment part mainly removes magnesium ions only, and therefore the consumption of the magnesium ion remover can decrease, and the magnesium ion remover can be used for a relatively long period of time.

Hereinafter, a sixth exemplary embodiment of the present disclosure will be described with reference to the drawings.

Figure 13:
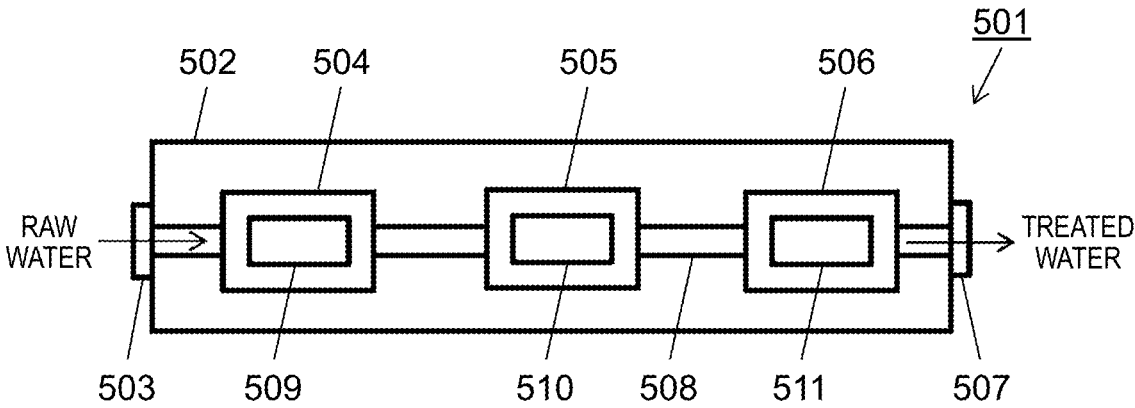
FIG. 13 is a schematic view showing a configuration of a water softening system according to a sixth exemplary embodiment of the present disclosure.

FIG. 13 is a schematic view showing a configuration of water softening system 501 according to the sixth exemplary embodiment.

As shown in FIG. 13, main body 502 of water softening system 501 is provided with hard water supply port 503, first treatment part 504, second treatment part 505, third treatment part 506, soft water outflow port 507, and pipe 508 connecting them.

Hard water supply port 503 is connected to a water pipe, and is supplied with hard water which is raw water containing calcium ions and magnesium ions (hereinafter, also simply referred to as "hard water").

First treatment part 504 is provided with granular alkali supplying body 509 for making hard water that has flowed in from hard water supply port 503 alkaline, and changing calcium ions into calcium carbonate crystals. That is, first treatment part 504 is provided with granular alkali supplying body 509 for supplying hydroxide ions to raw water containing calcium ions and magnesium ions to change the calcium ions contained in the raw water into calcium carbonate crystals.

Alkali supplying body 509 can adjust water to have a pH at which calcium ions in the water are crystallized but magnesium ions are hardly crystallized, and may be in any form of gas, liquid, or solid. In the case of an alkaline agent, sodium carbonate, sodium hydroxide, potassium hydroxide, or the like may be added, or hydroxide ions may be added by electrolysis of water. It may also be a metal or a metal oxide which reacts with water to supply hydroxide ions into water. Specifically, any metal that reacts with water may be used, for example Li, K, Ca, Na, Mg, Al, Zn, Fe, and the like can be considered. Li, K, Ca, Na react vigorously with water to alkalize water. Al, Zn, Fe react with high-temperature water to alkalize water. Because Mg reacts with water at room temperature, alkalization using Mg water is considered to be practically optimal.

The reaction formula between the magnesium solid and water is shown below.

$$Mg+2H_2O \rightarrow Mg^{2+}+2OH^-+H2\uparrow$$

The reaction between magnesium oxide and water is shown below.

$$MgO+H_2O \rightarrow Mg^{2+}+2OH^-$$

In this reaction, it is possible to make water alkaline by supplying hydroxide ions without generating hydrogen. In addition, a metal compound including a metal in the above-described metals may be used.

Here, a configuration of first treatment part 504 will be described with reference to FIG. 14.

Figure 14:
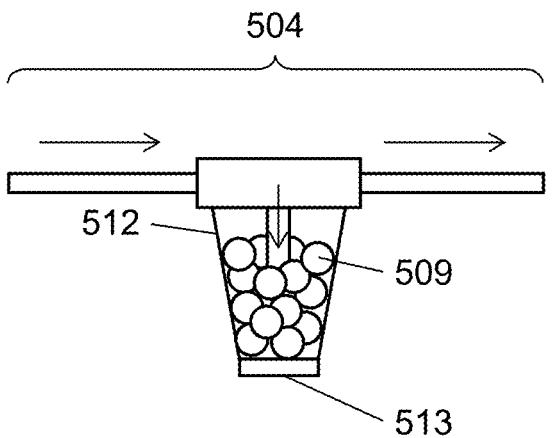
FIG. 14 is a schematic view showing a configuration of a first treatment part of the water softening system.

FIG. 14 is a schematic view showing a configuration of first treatment part 504.

As shown in FIG. 14, housing 512 is filled with granular alkali supplying bodies 509 in the bottom portion of first treatment part 504, and hard water introduced from the lower portion of housing 512 through pipe 508 goes upward while being in contact with alkali supplying bodies 509 and is conveyed to second treatment part 505. Ultrasonic wave generator 513 is provided in a lower part of housing 512, and ultrasonic vibration generated from ultrasonic wave generator 513 propagates through water to vibrate alkali supplying bodies 509. In the sixth exemplary embodiment, ultrasonic wave generator 513 is installed at the bottom portion of housing 512, but there is no difference in effect even when the ultrasonic wave generator is installed at any position as long as alkali supplying bodies 509 can be vibrated.

As shown in FIG. 13, second treatment part 505 is provided with filter body 510 for filtering water containing calcium carbonate that has flowed in from first treatment part 504. That is, second treatment part 505 is provided with filter body 510 which physically removes the calcium carbonate crystallized in first treatment part 504.

Filter body 510 only needs to be able to remove the crystallized calcium carbonate, and the particle size of the crystallized calcium carbonate is measured by a laser diffraction/scattering particle size distribution measuring apparatus, and is about 0.1 μm to 30 μm in terms of a median size. The filter body is not limited to this as long as it is a filter material commonly used in water purification applications by filtration, such as a filter, a membrane, sand, or fiber, to remove these particles. One example of a measuring instrument using the above-described laser diffraction/scattering type particle size distribution measuring apparatus is LA-960 manufactured by HORIBA, Ltd.

Third treatment part 506 is provided with magnesium ion remover 511 that removes magnesium ions of water containing magnesium ions that has flowed in from second treatment part 505. That is, third treatment part 506 is provided with magnesium ion remover 511 that removes magnesium ions in raw water.

Magnesium ion remover 511 only needs to remove magnesium ions from water. In particular, when the magnesium ion remover is a resin, it is preferable that the resin be an addition polymer of an unsaturated compound having a carboxyl group, whose particle size containing 1 wt % to 20 wt % of calcium is 0.1 mm to 5 mm. In addition, the material is not limited to this as long as it is a commonly used calcium/magnesium exchanger, an adsorbent, or a sorbent, such as zeolite, a strongly acidic ion exchange resin, or a weakly acidic ion exchange resin.

Soft water outflow port 507 is connected to pipe 508, and soft water that has flowed out from soft water outflow port 507 is distributed to a bathroom, a kitchen, or the like.

In the above configuration, the water that has passed through first treatment part 504 is modified into water containing calcium carbonate solid and magnesium ions, and flows into second treatment part 505. At this time, second treatment part 505 removes the calcium carbonate from the water. The water that has passed through second treatment part 505 is reformed into water containing magnesium ions and flows into third treatment part 506.

Third treatment part 506 removes magnesium ions from water by magnesium ion remover 511. The water that has passed through third treatment part 506 becomes soft water, flows out to soft water outflow port 507, and can be used in a bathroom or a kitchen.

With the above configuration, water softening system 501 of the sixth exemplary embodiment can selectively crystallize calcium ions in water on the upstream side of third treatment part 506 provided with magnesium ion remover 511 and remove the crystallized calcium carbonate by filter body 510. In this manner, in water softening system 501 according to the sixth exemplary embodiment, calcium ions are firstly crystallized into calcium carbonate and physically removed by first treatment part 504 and second treatment part 505, and then magnesium ions are removed from water by third treatment part 506. Therefore, water softening system 501 according to the sixth exemplary embodiment can reduce consumption of magnesium ion remover 511, and can use magnesium ion remover 511 for a relatively long period of time.

In addition, water softening system 501 according to the sixth exemplary embodiment can finely vibrate granular alkali supplying body 509 by the ultrasonic vibration generated from ultrasonic wave generator 513 provided in first treatment part 504 to promote the pH adjustment.

In addition, water softening system 501 according to the sixth exemplary embodiment can suppress sediments on alkali supplying bodies 509 by rubbing the alkali supplying bodies 509 with each other with the energy of ultrasonic vibration, and can supply hydroxide ions for a relatively long period of time. In addition, water softening system 501 according to the sixth exemplary embodiment can increase the water temperature by vibration of water molecules by ultrasonic vibration, and can stably supply hydroxide ions even when the water temperature is low in winter or cold climates.

Example 31

First, an example of crystallizing calcium ions will be described.

A reaction in a configuration in which first treatment part 504 is provided with a magnesium solid as one example of granular alkali supplying body 509 is shown.

First treatment part 504 is provided with a magnesium solid of about 6 mm, and raw water that has flowed in from hard water supply port 503 comes into contact with the magnesium. The reaction formula between the magnesium solid and water is shown below.

$$Mg + 2H_2O \rightarrow Mg^{2+} + 2OH^- + H2\uparrow \qquad (4)$$

$$HCO^{3-} + OH^- \rightarrow CO_3^{2-} + H_2O \qquad (5)$$

$$Ca^{2+} + CO_3^{2-} \rightarrow CaCO_3\downarrow \qquad (6)$$

The magnesium solid reacts with water to generate hydroxide ions ($OH^-$). Hydroxide ions ($OH^-$) and bicarbonate ions ($HCO^{3-}$) react to be carbonate ions ($CO_3^{2-}$). Calcium ions ($Ca^{2+}$) react with carbonate ions ($CO_3^{2-}$) to change into calcium carbonate crystals.

Figure 15:
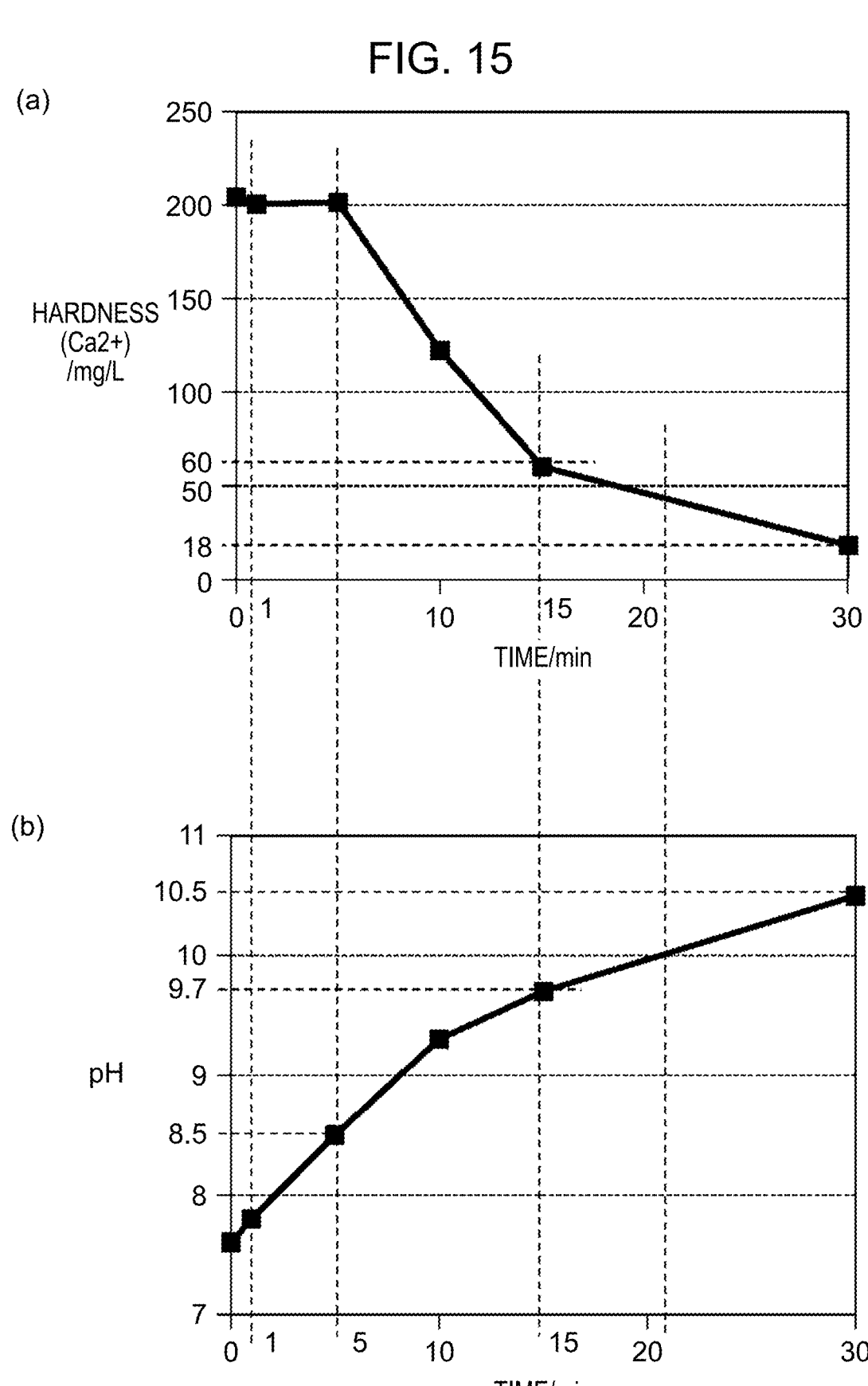
FIG. 15 includes graphs showing changes in an amount of calcium ions and a pH in a water softening system according to Example 3 of the sixth exemplary embodiment ((a) a graph showing a transition of calcium ions, (b) a graph showing a change in pH).

FIG. 15(a) is a graph showing the transition of calcium ions due to this reaction. FIG. 15(b) shows the results of the change in pH. FIGS. 15(a) and 15(b) show results when 2 g of a magnesium solid was added to 100 mL of tap simulated water having a hardness of 310 ppm and stirred. The aqueous solution obtained at each time after 2 g of the magnesium solid was added was collected, crystals were removed with a 0.2 μm filter, and the ion amount was measured. According to this, the pH increases with time, and calcium ions decrease as the pH increases. It is found that the amount of calcium ions is almost constant until the pH reaches about 8.5, but decreases when the pH reaches 8.5. This suggests that it is associated with an increase in calcium carbonate crystals. As shown in FIGS. 10(a) and 10(b), the pH gradually increased to reach pH 10 after 20 minutes, and about 75% of calcium ions were crystallized. At this time, crystals of magnesium ions could not be detected. From the above, alkali supplying body 509 according to Example 3 needs to adjust the pH to about 8 to 11 as a pH at which calcium ions in water are crystallized but magnesium ions are hardly crystallized.

The ion amount was measured by ion chromatography. One example of a measuring instrument is ICS-2100 manufactured by Dionex Corporation.

As described above, alkali supplying body 509 according to Example 3 can selectively crystallize calcium ions with respect to magnesium ions.

Example 4

Figure 16:
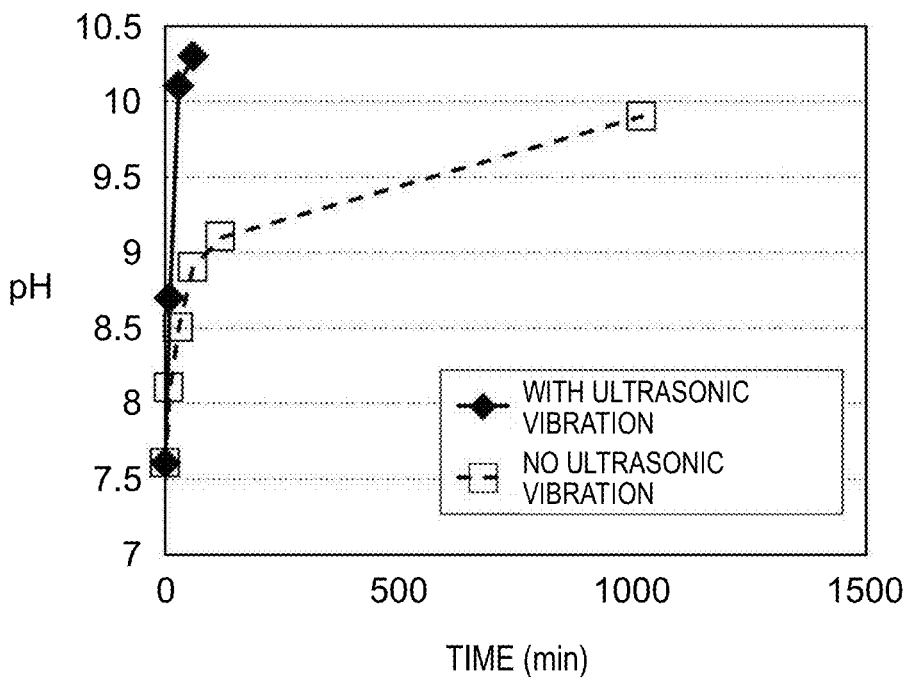
FIG. 16 is a graph showing an effect of promoting pH adjustment by ultrasonic vibration of a water softening system according to Example 4 of the sixth exemplary embodiment.

Next, an example of acceleration of pH adjustment by ultrasonic vibration will be described. Two beakers in which two magnesium solids of about 6 mm as granular alkali supplying body 509 were put in 40 mL of tap simulated water having a hardness of 310 ppm were prepared, and a change in pH over time was measured in a state of being left standing. One of them was placed in a water tank provided with an ultrasonic element, and ultrasonic waves were generated. The results are shown in FIG. 16.

The pH in the beaker only containing the magnesium solids increased to about 9 in 1 hour, but then the speed decreased and the pH did not reach 10 after 17 hours. This is considered to be because when the reaction represented by the reaction formula described above occurred on the surface of the magnesium solid, the crystals deposited by the reaction of the reaction formula (6) were retained on the surfaces or around the magnesium solids, and therefore a part of the crystals was attached to the magnesium solid, and the reaction of the reaction formula (4) was inhibited from occurring. On the other hand, the pH in the beaker to which ultrasonic vibration is applied reached pH 10 in 30 minutes from the start, and the pH at which calcium ions are stably crystallized can be maintained in a short time as compared with the case without ultrasonic vibration.

Example 51

Next, water softening system 501 according to Example 5 of the sixth exemplary embodiment will be described.

Figure 17:
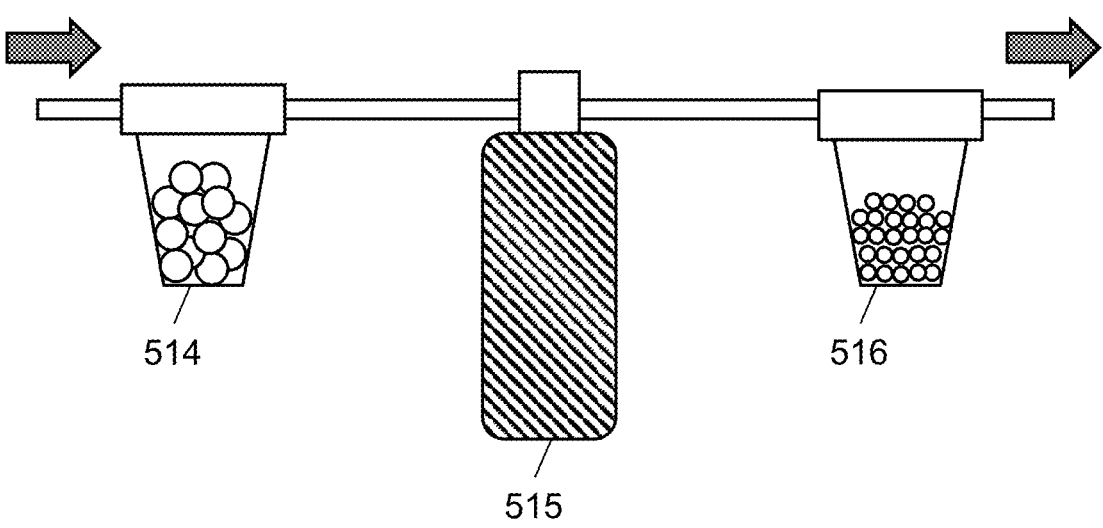
FIG. 17 is a schematic view showing a configuration of a water softening system according to Example 5 of the sixth exemplary embodiment.

FIG. 17 is a schematic view showing a configuration of water softening system 501 according to Example 5 of the sixth exemplary embodiment.

As shown in FIG. 17, first treatment part 504 is provided with magnesium solids 514, and second treatment part 505 is provided with filter 515. In addition, third treatment part 506 is provided with resin 516 which is an addition polymer of an unsaturated compound having a carboxyl group, whose particle size containing 1 wt % to 20 wt % of calcium is in a range of from 0.1 mm to 5 mm. That is, Example 5 shows a configuration in which magnesium solids 514 is provided as one example of alkali supplying body 509, filter 515 is provided as one example of filter body 510, and resin 516 is provided as one example of magnesium ion remover 511.

Figure 18:
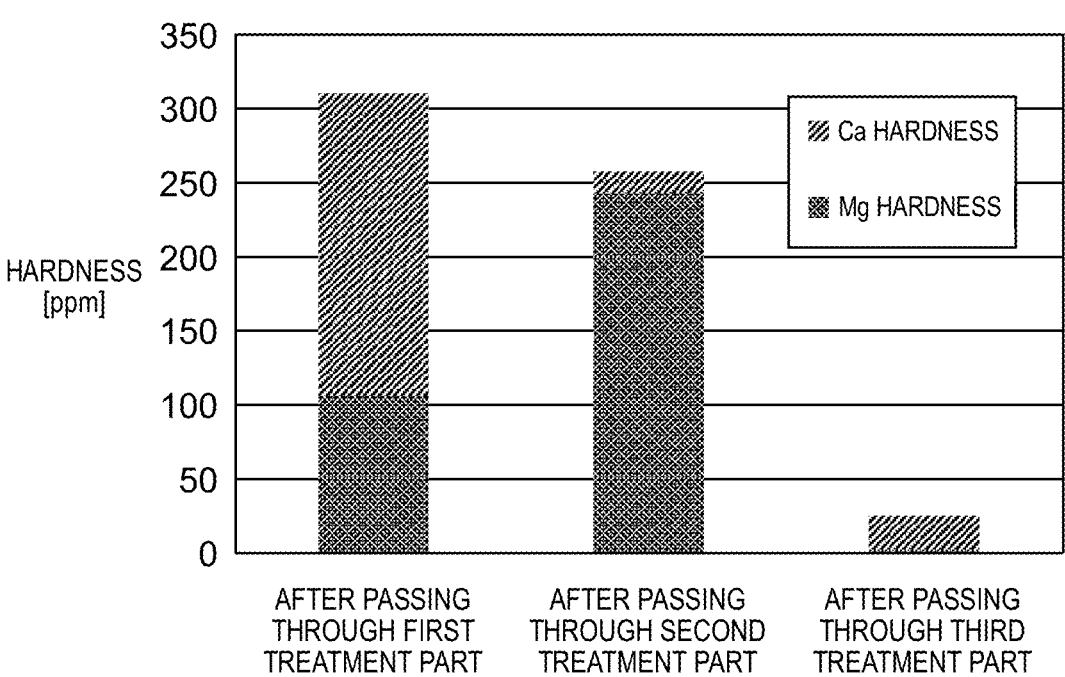
FIG. 18 is a graph showing changes in hardness in each treatment step of the water softening system.

FIG. 18 shows results of a principle confirmation test of first treatment part 504, second treatment part 505, and third treatment part 506. In the procedure of the principle confirmation test, 100 mL of tap simulated water having a hardness of 310 ppm was prepared as raw water, and as first treatment part 504, a magnesium solid was added to the tap simulated water so as to be 1 g and stirred for 60 minutes. Next, as second treatment part 505, the water was filtered through a 0.2 μm filter. Thereafter, as third treatment part 506, 0.5 mL of a resin which is an addition polymer of an unsaturated compound having a carboxyl group is added to the filtered water from second treatment part 505 and stirred for 60 minutes.

The raw water after the treatment with first treatment part 504 contains 204 ppm of calcium and 106 ppm of magnesium ions in 310 ppm of hard water. When the raw water has passed through second treatment part 505, the amount of calcium decreases to 14 ppm, while the amount of magnesium ions is 244 ppm, and the total hardness is 258 ppm. When the raw water has passed through third treatment part 506, the amount of calcium ions was 22 ppm and the amount of magnesium ions was 3 ppm, and the total hardness was able to be reduced to 25 ppm. The increase in calcium ions through the steps with second treatment part 505 and third treatment part 506 is a measurement error. As a result, the life of magnesium ion remover 511 was able to be extended about 1.2 times. The same ion chromatography as in Example 3 was used for the measurement.

That is, water softening system 501 according to Example 5 of the sixth exemplary embodiment can extend the life of magnesium ion remover 511 and soften hard water by passing water through first treatment part 504, second treatment part 505, and third treatment part 506 in this order.

Water softening system 501 according to the sixth exemplary embodiment is useful for suppressing scale damage in a hard water region.

Seventh Exemplary Embodiment

The present disclosure relates to a water softening system for removing hardness components contained in tap water or the like.

Conventionally, a method has been known in which a water softening system using an ion exchange resin is connected to a tap to adsorb calcium ions and magnesium ions contained in hard water. When the adsorption power of the ion exchange resin is lost, adsorbed calcium ions and magnesium ions are replaced with sodium ions through salt water to regenerate and activate the adsorption capability (see, for example PTL 5).

In such a conventional water softening system, it is necessary to periodically send salt water having a high concentration to the water softening system in order to regenerate the ion exchange resin, and there is a problem that it takes time and effort for maintenance.

Therefore, an object of the present disclosure is to provide a water softening system capable of removing calcium ions and magnesium ions, which are hardness components in water, over a relatively long period of time.

A water softening system according to the present disclosure includes a first treatment part, a second treatment part, and a third treatment part, wherein the first treatment part is provided with an alkali supplying body that supplies hydroxide ions to raw water containing calcium ions and magnesium ions and changes the calcium ions contained in the raw water into calcium carbonate crystals, and includes a reaction tank for promoting crystallization of calcium carbonate at a subsequent stage of the alkali supplying body, the second treatment part is provided with a filter body that physically removes calcium carbonate crystallized in the first treatment part, the third treatment part is provided with a magnesium ion remover that removes magnesium ions in the raw water, and each treatment is performed in order of the first treatment part, the second treatment part, and the third treatment part.

The water softening system according to the present disclosure can remove calcium ions and magnesium ions, which are hardness components in water, over a relatively long period of time.

The water softening system according to the present disclosure includes a first treatment part, a second treatment part, and a third treatment part, wherein the first treatment part is provided with an alkali supplying body that supplies hydroxide ions to raw water containing calcium ions and magnesium ions and changes the calcium ions contained in the raw water into calcium carbonate crystals, and includes a reaction tank for promoting crystallization of calcium carbonate at a subsequent stage of the alkali supplying body, the second treatment part is provided with a filter body that physically removes calcium carbonate crystallized in the first treatment part, the third treatment part is provided with a magnesium ion remover that removes magnesium ions in the raw water, and each treatment is performed in order of the first treatment part, the second treatment part, and the third treatment part.

The water softening system according to the present disclosure first crystallizes calcium ions into calcium carbonate and physically removes them, and then removes magnesium ions. This allows the water softening system according to the present disclosure to suppress consumption of the magnesium ion remover and to use the magnesium ion remover for a relatively long period of time. In addition, the water softening system according to the present disclosure can increase the percentage of crystallization of calcium carbonate by the reaction tank provided in the first treatment part, and can remove calcium ions with high efficiency. In addition, the crystal size of calcium carbonate becomes larger because of the extended reaction time, which facilitates the filtration in the second treatment part.

In addition, the alkali supplying body in the water softening system according to the present disclosure adjusts the pH of water to a pH at which calcium ions in the water are crystallized but magnesium ions are hardly crystallized.

The water softening system according to the present disclosure selectively crystallizes calcium ions in water on the upstream side of the third treatment part and removes the calcium ions by the filter body. In the water softening system according to the present disclosure, the third treatment part mainly removes magnesium ions only, and therefore the consumption of the magnesium ion remover can decrease, and the magnesium ion remover can be used for a relatively long period of time.

Hereinafter, a seventh exemplary embodiment of the present disclosure will be described with reference to the drawings.

Figure 19:
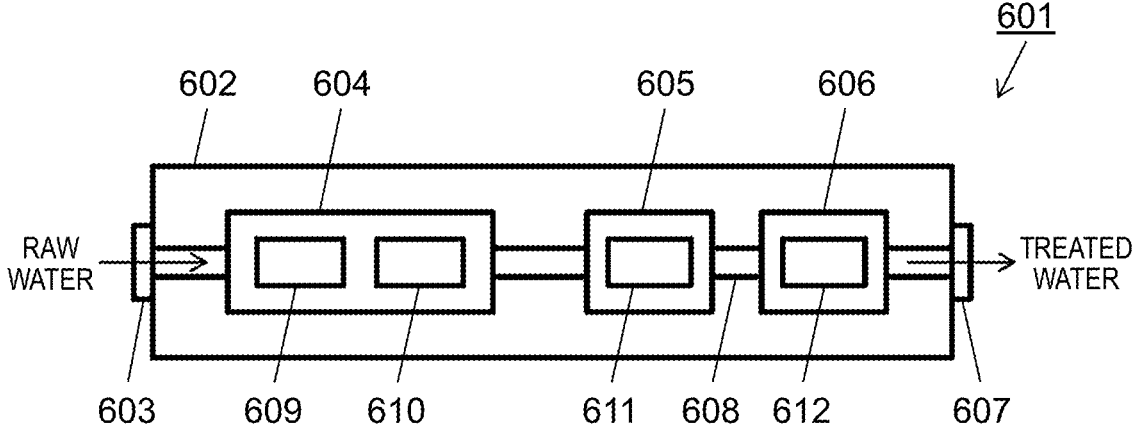
FIG. 19 is a schematic view showing a configuration of a water softening system according to a seventh exemplary embodiment of the present disclosure.

FIG. 19 is a schematic view showing a configuration of water softening system 601 according to the seventh exemplary embodiment.

As shown in FIG. 19, main body 602 of water softening system 601 is provided with hard water supply port 603, first treatment part 604, second treatment part 605, third treatment part 606, soft water outflow port 607, and pipe 608 connecting them.

Hard water supply port 603 is connected to a water pipe, and is supplied with hard water which is raw water containing calcium ions and magnesium ions (hereinafter, also simply referred to as "hard water").

First treatment part 604 is provided with alkali supplying body 609 for making hard water that has flowed in from hard water supply port 603 alkaline, and changing calcium ions into calcium carbonate crystals. That is, first treatment part 604 is provided with alkali supplying body 609 that supplies hydroxide ions to raw water containing calcium ions and magnesium ions to change calcium ions contained in the raw water into calcium carbonate crystals.

Alkali supplying body 609 can adjust water to have a pH at which calcium ions in the water are crystallized but magnesium ions are hardly crystallized, and may be in any form of gas, liquid, or solid. In the case of an alkaline agent, sodium carbonate, sodium hydroxide, potassium hydroxide, or the like may be added, or hydroxide ions may be added by electrolysis of water. It may also be a metal or a metal oxide which reacts with water to supply hydroxide ions into water. Specifically, any metal that reacts with water may be used, for example Li, K, Ca, Na, Mg, Al, Zn, Fe, and the like can be considered. Li, K, Ca, Na react vigorously with water to alkalize water. Al, Zn, Fe react with high-temperature water to alkalize water. Because Mg reacts with water at room temperature, alkalization using Mg water is considered to be practically optimal.

The reaction formula between the magnesium solid and water is shown below.

$$Mg + 2H_2O \rightarrow Mg^{2+} + 2OH^- + H2\uparrow \qquad \text{(Formula 1)}$$

The reaction between magnesium oxide and water is shown below.

$$MgO + H_2O \rightarrow Mg^{2+} + 2OH^- \qquad \text{(Formula 2)}$$

This reaction can be used without generating hydrogen. In addition, a metal compound including a metal in the above-described metals may be used.

In addition, first treatment part 604 is provided with reaction tank 610 for promoting the crystallization of calcium carbonate at a subsequent stage of alkali supplying body 609.

Reaction tank 610 is a tank for reacting hard water with the hydroxide ions supplied from alkali supplying body 609, and preferably has a capacity capable of securing a time during which all the hydroxide ions are consumed in the reaction. When the contact time with alkali supplying body 609 is extended in order to secure the reaction time, the reaction of (Formula 1) excessively proceeds, and the consumption of the magnesium solid becomes fast. Therefore, it is necessary to provide reaction tank 610 which is another container in which water is not in contact with the magnesium solid.

The reaction time in reaction tank 610 is preferably no less than or equal to the contact time when hard water and the magnesium solid make contact with each other, that is, the volume of the reaction tank 610 is preferably no less than or equal to the volume of the magnesium solid.

The shape of reaction tank 610 is a shape in which the inflow water to reaction tank 610 and the outflow water are not mixed, and for example, the inside of the tank has a cylindrical double structure, and has a structure in which water flows in one direction without backflow when water passes.

As another structure, a pipe shape or the like for taking a reaction time while causing water to pass through may be provided instead of reaction tank 610. A stirring mechanism that promotes crystallization may be provided in reaction tank 610, or an uneven shape that facilitates crystallization may be provided in reaction tank 610.

Second treatment part 605 is provided with filter body 611 for filtering water containing calcium carbonate that has flowed in from first treatment part 604. That is, second treatment part 605 is provided with filter body 611 which physically removes the calcium carbonate crystallized in first treatment part 604.

Filter body 611 only needs to be able to remove the crystallized calcium carbonate, and the particle size of the crystallized calcium carbonate is measured by a laser diffraction/scattering particle size distribution measuring apparatus, and is about 0.1 μm to 30 μm in terms of a median size. The filter body is not limited to this as long as it is a filter material commonly used in water purification applications by filtration, such as a filter, a membrane, sand, or fiber, to remove these particles. One example of a measuring instrument using the above-described laser diffraction/scattering type particle size distribution measuring apparatus is LA-960 manufactured by HORIBA, Ltd.

Third treatment part 606 is provided with magnesium ion remover 612 that removes magnesium ions of water containing magnesium ions that has flowed in from second treatment part 605. That is, third treatment part 606 is provided with magnesium ion remover 612 that removes magnesium ions in raw water.

Magnesium ion remover 612 only needs to remove magnesium ions from water. In particular, when the magnesium ion remover is a resin, it is preferable that the resin be an addition polymer of an unsaturated compound having a carboxyl group, whose particle size containing 1 wt % to 20 wt % of calcium is 0.1 mm to 5 mm. In addition, the material is not limited to this as long as it is a commonly used calcium/magnesium exchanger, an adsorbent, or a sorbent, such as zeolite, a strongly acidic ion exchange resin, or a weakly acidic ion exchange resin.

Soft water outflow port 607 is connected to pipe 608, and the soft water that has flowed out from soft water outflow port 607 is distributed to a bathroom, a kitchen, or the like.

In the above configuration, the water that has passed through first treatment part 604 is modified into water containing calcium carbonate solid and magnesium ions, and flows into second treatment part 605. At this time, second treatment part 605 removes the calcium carbonate from the water. The water that has passed through second treatment part 605 is reformed into water containing magnesium ions and flows into third treatment part 606.

Third treatment part 606 removes magnesium ions from water by magnesium ion remover 612. The water that has passed through third treatment part 606 becomes soft water, flows out to soft water outflow port 607, and can be used in a bathroom or a kitchen.

As described above, water softening system 601 according to the seventh exemplary embodiment can selectively crystallize calcium ions in water on the upstream side of third treatment part 606 provided with magnesium ion remover 612 and remove the crystallized calcium carbonate by filter body 611. In this manner, in water softening system 601 according to the seventh exemplary embodiment, calcium ions are firstly crystallized into calcium carbonate and physically removed by first treatment part 604 and second treatment part 605, and then magnesium ions are removed from water by third treatment part 606. Therefore, water softening system 601 according to the seventh exemplary embodiment can reduce consumption of magnesium ion remover 612, and can use magnesium ion remover 612 for a relatively long period of time. In addition, water softening system 601 according to the seventh exemplary embodiment can increase the percentage of crystallization of calcium carbonate by reaction tank 610 provided in first treatment part 604, and can remove calcium ions with high efficiency. In addition, in water softening system 601 according to the seventh exemplary embodiment, the crystal size of calcium carbonate becomes larger because of the extended reaction time, which facilitates the filtration in second treatment part 605.

Example 61

First, an example of crystallizing calcium ions will be described.

A reaction in a configuration in which a magnesium solid is provided in first treatment part 604 as one example of alkali supplying body 609 will be described.

First treatment part 604 is provided with a magnesium solid of about 6 mm, and raw water flowed in from hard water supply port 603 comes into contact with the magnesium. The reaction formula between the magnesium solid and water is shown below.

$$Mg+2H_2O \rightarrow Mg^{2+}+2OH^-+H2\uparrow \qquad \text{(Formula 3)}$$

$$HCO^{3-}+OH^- \rightarrow CO_3^{2-}+H_2O \qquad \text{(Formula 4)}$$

$$Ca^{2+}+CO_3^{2-} \rightarrow CaCO_3\downarrow \qquad \text{(Formula 5)}$$

The magnesium solid reacts with water to generate hydroxide ions (OH). Hydroxide ions (OH) and bicarbonate ions ($HCO^{3-}$) react to be carbonate ions ($CO_3^{2-}$). Calcium ions ($Ca^{2+}$) react with carbonate ions ($CO_3^{2-}$) to change into calcium carbonate crystals.

Figure 20:
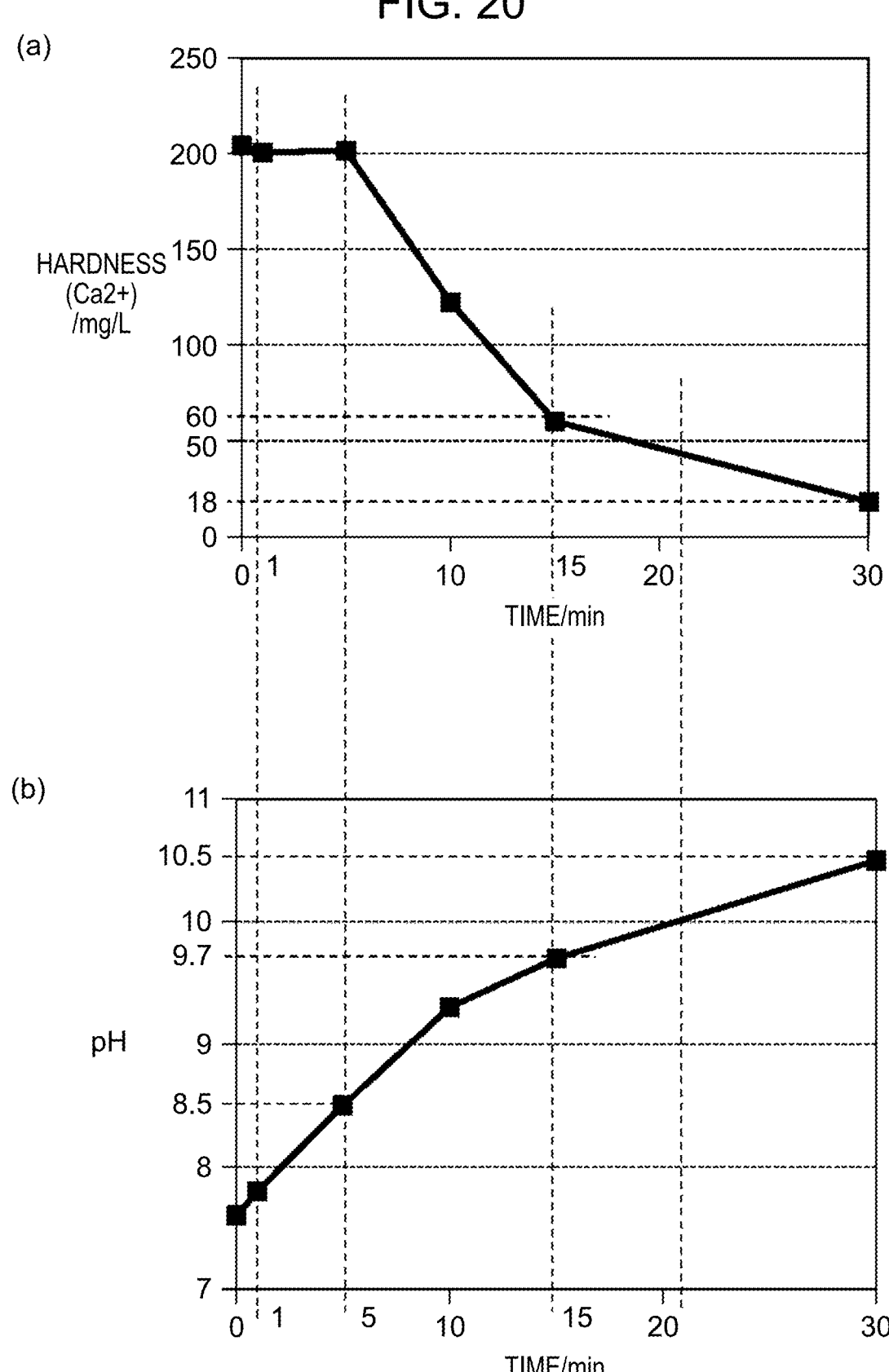
FIG. 20 includes graphs showing changes in an amount of calcium ions and a pH in a water softening system according to Example 6 of the seventh exemplary embodiment ((a) a graph showing a transition of calcium ions, (b) a graph showing a change in pH).

FIG. 20(a) is a graph showing the transition of calcium ions due to this reaction. FIG. 20(b) shows the results of the change in pH. FIGS. 20(a) and 20(b) show results when 2 g of a magnesium solid was added to 100 mL of tap simulated water having a hardness of 310 ppm and stirred. The aqueous solution obtained at each time after 2 g of the magnesium solid was added was collected, crystals were removed with a 0.2 μm filter, and the ion amount was measured. According to this, the pH increases with time, and calcium ions decrease as the pH increases. It is found that the amount of calcium ions is almost constant until the pH reaches about 8.5, but decreases when the pH reaches 8.5. This suggests that it is associated with an increase in calcium carbonate crystals. As shown in FIGS. 20(a) and 20(b), the pH gradually increased to reach pH 10 after 20 minutes, and about 75% of calcium ions were crystallized. At this time, crystals of magnesium ions could not be detected. From the above, the alkali supplying body 609 according to Example 6 needs to adjust the pH to about pH 8 to pH 11 as a pH at which calcium ions in the water are crystallized but magnesium ions are hardly crystallized.

The ion amount was measured by ion chromatography. One example of a measuring instrument is ICS-2100 manufactured by Dionex Corporation.

As described above, alkali supplying body 609 according to Example 6 can selectively crystallize calcium ions with respect to magnesium ions. When water is alkalized with an alkaline agent, there is a problem that a large amount of chemical agent is required, or counterions increase, and therefore the water is not suitable as domestic water. On the other hand, water softening system 601 according to Example 6 only increases magnesium ions in water by alkalization using the magnesium solid, and the water can be used as domestic water without any problem.

Example 7

Next, water softening system 601 according to Example 7 of the seventh exemplary embodiment will be described.

Figure 21:
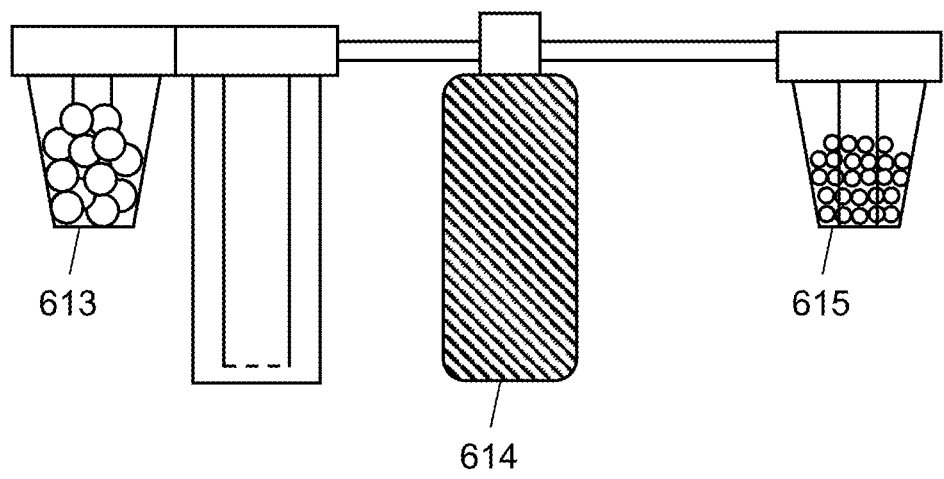
FIG. 21 is a schematic view showing a configuration of a water softening system according to Example 7 of the seventh exemplary embodiment.

FIG. 21 is a schematic view showing a configuration of water softening system 601 according to Example 7 of the seventh exemplary embodiment.

As shown in FIG. 21, first treatment part 604 is provided with magnesium solid 613, and second treatment part 605 is provided with filter 614. In addition, third treatment part 606 is provided with resin 615 which is an addition polymer of an unsaturated compound having a carboxyl group, whose particle size containing 1 wt % to 20 wt % of calcium is in a range of from 0.1 mm to 5 mm. That is, Example 7 shows a configuration in which magnesium solids 613 is provided as one example of alkali supplying body 609, filter 614 is provided as one example of filter body 611, and resin 615 is provided as one example of magnesium ion remover 612.

Figure 22:
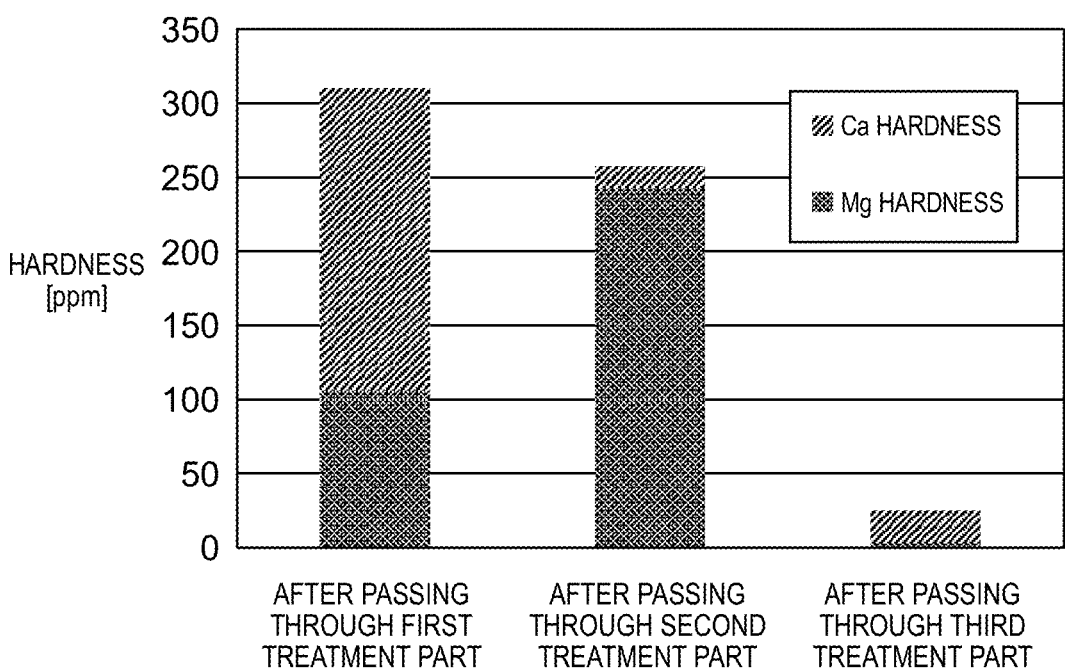
FIG. 22 is a graph showing changes in hardness in each treatment step of the water softening system.

FIG. 22 shows results of a principle confirmation test of first treatment part 604, second treatment part 605, and third treatment part 606. In the procedure of the principle confirmation test, 100 mL of tap simulated water having a hardness of 310 ppm was prepared as raw water, and as first treatment part 604, a magnesium solid was added to the tap simulated water so as to be 1 g and stirred for 60 minutes. Next, as second treatment part 605, the water was filtered through a 0.2 μm filter. Thereafter, as third treatment part 606, 0.5 mL of a resin which is an addition polymer of an unsaturated compound having a carboxyl group is added to the filtered water from second treatment part 605 and stirred for 60 minutes.

The raw water after the treatment with first treatment part 604 contains 204 ppm of calcium and 106 ppm of magnesium ions in 310 ppm of hard water. When the raw water has passed through second treatment part 605, the amount of calcium decreases to 14 ppm, while the amount of magnesium ions is 244 ppm, and the total hardness is 258 ppm. When the raw water has passed through third treatment part 606, the amount of calcium ions was 22 ppm and the amount of magnesium ions was 3 ppm, and the total hardness was able to be reduced to 25 ppm. The increase in calcium ions through the steps with second treatment part 605 and third treatment part 606 is a measurement error.

As a result, the life of magnesium ion remover 612 was able to be extended about 1.2 times. The same ion chromatography as in Example 6 was used for the measurement.

That is, water softening system 601 according to Example 7 of the seventh exemplary embodiment can extend the life of magnesium ion remover 612 and soften hard water by passing water through first treatment part 604, second treatment part 605, and third treatment part 606 in this order.

Example 81

Figure 23:
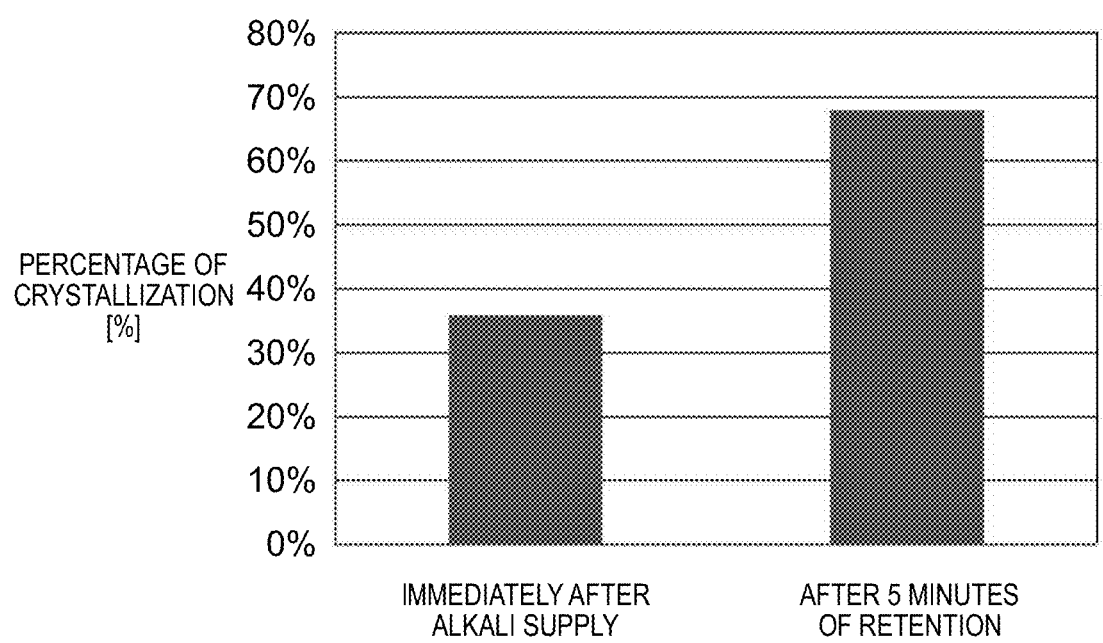
FIG. 23 is a graph showing changes in percentage of crystallization with reaction time in a water softening system according to Example 8 of the seventh exemplary embodiment.
Figure 24:
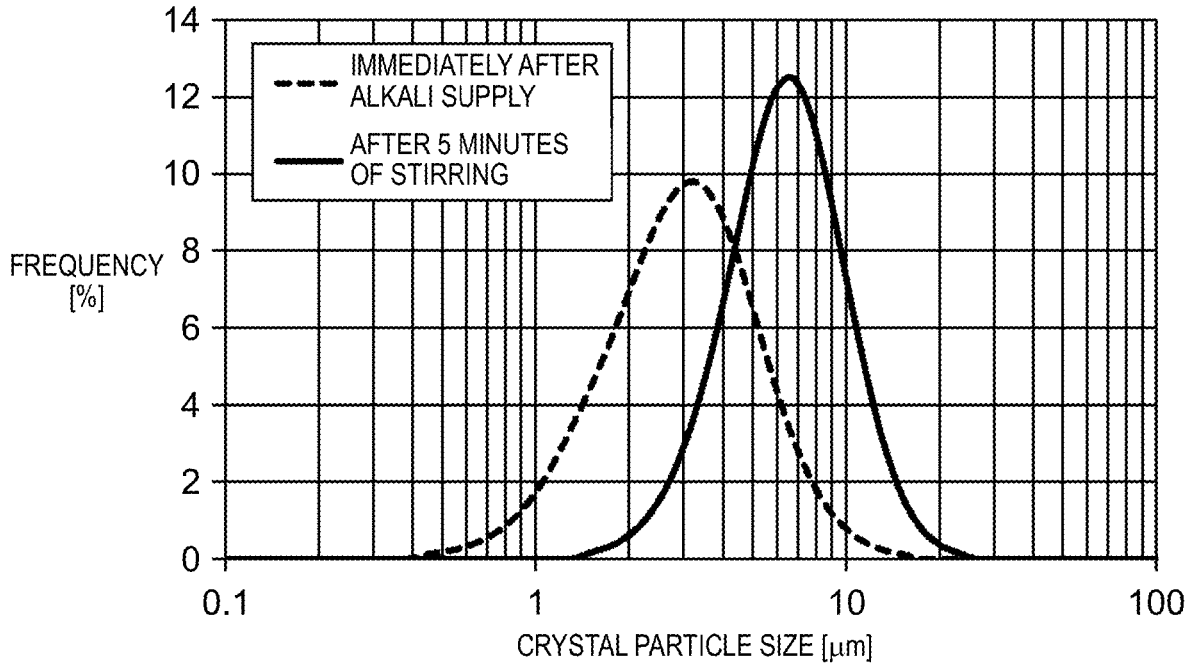
FIG. 24 is a graph showing changes in crystal particle size with reaction time in the water softening system.

To confirm the effectiveness of the reaction time when water passes through reaction tank 610, the verification results of crystallization and an increase in particle size when the reaction time is secured with water flowing are shown in FIG. 23 and FIG. 24.

In the effect verification, water immediately after the alkali supply in first treatment part 604 was stirred for 5 minutes, and the percentage of crystallization and the particle size before and after stirring were measured. As shown in FIG. 23, the percentage of crystallization of calcium carbonate before stirring (see the graph on the left side of FIG. 23) was 36%, whereas the percentage of crystallization increased to 68% after stirring (see the graph on the right side of FIG. 23). In addition, as shown in FIG. 24, the median particle size of calcium carbonate before stirring (indicated by the dotted line) was 2.8 μm, whereas the median particle size became 6.0 μm after stirring. Therefore, it is understood that the percentage of crystallization and the crystal particle size are affected by the reaction time after alkali supply.

The same applies to the time for passing water through reaction tank 610. That is, water softening system 601 according to Example 7 of the seventh exemplary embodiment includes reaction tank 610 having a channel that sufficiently promotes crystallization at a subsequent stage of alkali supplying body 609 of first treatment part 604. Therefore, water softening system 601 according to Example 7 of the seventh exemplary embodiment can increase the percentage of crystallization of calcium carbonate, and can extend the life of magnesium ion remover 612 in the subsequent stage. In addition, water softening system 601 according to Example 7 of the seventh exemplary embodiment can increase the crystal particle size of calcium carbonate and increase the filtration rate in the subsequent stage.

Water softening system 601 according to the seventh exemplary embodiment is useful for suppressing scale damage in a hard water region.

INDUSTRIAL APPLICABILITY

The water softening system according to the present disclosure can be applied to a point-of-use (POU) water purification system or a point-of-entry (POE) water purification system.

REFERENCE MARKS IN THE DRAWINGS

101 water softening system
101*a* water softening system
102 inflow port
103 water softening tank
104 neutralization tank
104*a* first neutralization tank
104*b* second neutralization tank
105 water take-out port
106 regeneration apparatus
107 channel
108 channel
109 channel
109*a* channel
109*b* channel
110 weakly acidic cation exchange resin
111 weakly basic anion exchange resin
111*a* weakly basic anion exchange resin
112 electrolysis tank
113 treatment tank
114 water pump
115 circulation channel
115*a* first circulation channel
115*b* second circulation channel
116 first supply channel
117 first recovery channel
118 second supply channel
119 second recovery channel
120 on-off valve
121 on-off valve

122 on-off valve
123 on-off valve
124 on-off valve
125 on-off valve
126 on-off valve
127 water delivery channel
129 filtration part
130 on-off valve
131 on-off valve
132 air vent valve
133 electrode
134 Venturi tube
135 three-way valve
136 three-way valve
137 raw water supply channel
201 water softening system
202 inflow port
203 water softening tank
204 neutralization tank
205 water take-out port
206 regeneration apparatus
207 channel
208 channel
209 channel
210 weakly acidic cation exchange resin
211 calcium carbonate
212 electrolysis tank
213 treatment tank
214 water pump
215 circulation channel
216 first supply channel
217 recovery channel
218 second supply channel
219 water delivery channel
220 filtration part
221 on-off valve
222 on-off valve
223 on-off valve
224 on-off valve
225 on-off valve
226 on-off valve
227 on-off valve
229 air valve
301 water softening system
302 main body
303 inlet
304 outlet
305 pipe
306 first reaction tank
307 second reaction tank
308 filtration tank
309 pH adjusting agent supply part
310 ultrasonic vibrator
311 flocculant supply part
401 water softening system
402 main body
403 hard water supply port
404 first treatment part
405 second treatment part
406 third treatment part
407 soft water outflow port
408 pipe
409 alkali supplying body
410 filter body
411 magnesium ion remover
412 magnesium solid
413 filter 414 resin
501 water softening system
502 main body
503 hard water supply port
504 first treatment part
505 second treatment part
506 third treatment part
507 soft water outflow port
508 pipe
509 alkali supplying body
510 filter body
511 magnesium ion remover
512 housing
513 ultrasonic wave generator
514 magnesium solid
515 filter
516 resin
601 water softening system
602 main body
603 hard water supply port
604 first treatment part
605 second treatment part
606 third treatment part
607 soft water outflow port
608 pipe
609 alkali supplying body
610 reaction tank
611 filter body
612 magnesium ion remover
613 magnesium solid
614 filter
615 resin

The invention claimed is:

1. A water softening system comprising:
a water softening tank for softening raw water containing a hardness component to softened water with a weakly acidic cation exchange resin;
at least one neutralization tank for neutralizing a pH of the softened water with a weakly basic anion exchange resin, wherein the weakly basic anion exchange resin includes anions as terminals of functional groups included therein, the weakly basic anion exchange resin adsorbs hydrogen ions contained in the softened water with the anions to neutralize the softened water, and the softened water has flowed through the water softening tank;
an electrolysis tank for generating acidic electrolyzed water and alkaline electrolyzed water, wherein the acidic electrolyzed water is used for regenerating the weakly acidic cation exchange resin of the water softening tank and the alkaline electrolyzed water is used for regenerating the weakly basic anion exchange resin of the at least one neutralization tank;
a treatment tank for mixing acidic electrolyzed water that has flowed through the water softening tank and alkaline electrolyzed water that has flowed through the at least one neutralization tank to generate a mixture, and supplying the mixture to the electrolysis tank;
a first supply channel for drawing the acidic electrolyzed water from the electrolysis tank and delivering the acidic electrolyzed water to an upstream side of the water softening tank;
a second supply channel for drawing the alkaline electrolyzed water from the electrolysis tank and delivering the alkaline electrolyzed water from the electrolysis tank directly to the at least one neutralization tank;

a first recovery channel connecting an upstream side of the treatment tank to a downstream side of the water softening tank; and
a second recovery channel connecting the upstream side of the treatment tank to a downstream side of the at least one neutralization tank,
wherein:
the acidic electrolyzed water generated in the electrolysis tank is provided to the water softening tank via the first supply channel and the alkaline electrolyzed water generated in the electrolysis tank is provided to the at least one neutralization tank via the second supply channel,
the treatment tank mixes the acidic electrolyzed water that has flowed through the first recovery channel and the alkaline electrolyzed water that has flowed through the second recovery channel, and
the mixture is caused to flow from the treatment tank to the electrolysis tank.

2. The water softening system according to claim 1, wherein the water softening system is configured such that in a water softening treatment, by switching of on-off valves, the water softening system causes the raw water supplied from an outside to flow through the water softening tank and the at least one neutralization tank in this order and discharges the softened water,
wherein the water softening system is configured such that on-off valves are respectively disposed on the first supply channel, the second supply channel, the first recovery channel, and the second recovery channel to control water flowing in each of the channels, and
in a regeneration treatment, by switching of the on-off valves, the water softening system supplies water in the treatment tank from the electrolysis tank to the water softening tank through the first supply channel, recovers water that has flowed through the water softening tank into the treatment tank through the first recovery channel, supplies water in the treatment tank from the electrolysis tank to the at least one neutralization tank through the second supply channel, and recovers water that has flowed through the at least one neutralization tank into the treatment tank through the second recovery channel.

3. The water softening system according to claim 1, wherein
the water softening system further comprises a separation tank disposed between the treatment tank and the electrolysis tank,
the treatment tank generates a reaction product by a reaction between the acidic electrolyzed water that has flowed through the water softening tank and the alkaline electrolyzed water that has flowed through the at least one neutralization tank, and
the separation tank is configured to separate the reaction product contained in water that has flowed through the treatment tank before the water that has flowed through the treatment tank is supplied to the electrolysis tank.

4. The water softening system according to claim 1, wherein
the at least one neutralization tank includes a first neutralization tank for neutralizing the pH of the softened water that has flowed through the water softening tank with the weakly basic anion exchange resin, and a second neutralization tank for neutralizing softened water that has flowed through the first neutralization tank, wherein:

the second neutralization tank is provided with a Venturi tube, neutralization of the softened water in the second neutralization tank is by air aeration of the Venturi tube, and during the air aeration, a flow of the softened water that has flowed through the first neutralization tank to the second neutralization tank causes a pressure change to occur in the Venturi tube, causing external air being sucked, and the sucked air is released as microbubbles into the softened water that has come out of the first neutralization tank, free carbonic acid contained in the softened water that has come out of the first neutralization tank is released into the air by the microbubbles, thus the softened water that has come out of the first neutralization tank is further neutralized.

*    *    *    *    *